(12) United States Patent
Cai et al.

(10) Patent No.: US 12,525,173 B2
(45) Date of Patent: Jan. 13, 2026

(54) FRAME RATE SWITCHING METHOD AND APPARATUS

(71) Applicant: Honor Device Co., Ltd., Guangdong (CN)

(72) Inventors: Lifeng Cai, Shenzhen (CN); Kai Zhang, Shenzhen (CN); Xuechen Sun, Shenzhen (CN)

(73) Assignee: Honor Device Co., Ltd., Shenzhen (CN)

( * ) Notice: Subject to any disclaimer, the term of this patent is extended or adjusted under 35 U.S.C. 154(b) by 266 days.

(21) Appl. No.: 18/254,523

(22) PCT Filed: Sep. 8, 2022

(86) PCT No.: PCT/CN2022/117946
§ 371 (c)(1),
(2) Date: May 25, 2023

(87) PCT Pub. No.: WO2023/124227
PCT Pub. Date: Jul. 6, 2023

(65) Prior Publication Data
US 2024/0105107 A1    Mar. 28, 2024

(30) Foreign Application Priority Data

Dec. 29, 2021  (CN) .................. 202111645845.2
Feb. 28, 2022  (CN) .................. 202210191911.1

(51) Int. Cl.
*G09G 3/32*     (2016.01)
*G06F 3/14*     (2006.01)
*G06F 9/54*     (2006.01)

(52) U.S. Cl.
CPC ............. *G09G 3/32* (2013.01); *G06F 3/14* (2013.01); *G06F 9/54* (2013.01);
(Continued)

(58) Field of Classification Search
CPC .......... G09G 3/32; G09G 2320/0613; G09G 2340/0435; G09G 2340/0471;
(Continued)

(56) References Cited

U.S. PATENT DOCUMENTS

2014/0092113 A1*  4/2014  Petersen .............. G09G 5/12
                                                              345/545
2017/0352322 A1* 12/2017  Spence ................. H04N 7/01
(Continued)

FOREIGN PATENT DOCUMENTS

CN    110045908 A    7/2019
CN    113625860 A   11/2021
(Continued)

*Primary Examiner* — Jin Ge
(74) *Attorney, Agent, or Firm* — Rimon PC

(57) ABSTRACT

Embodiments of this application provide a frame rate switching method and apparatus, applied to the field of terminal technologies. The method includes: drawing and rendering, by an application thread, a first image frame at a frame interval corresponding to a first frame rate in a first period; drawing and rendering, by the application thread, a second image frame at a frame interval corresponding to a second frame rate in a second period, where the second period is preceded by the first period, and the second frame rate is different from the first frame rate.

14 Claims, 14 Drawing Sheets

(52) U.S. Cl.
CPC .............. *G09G 2320/0613* (2013.01); *G09G 2340/0435* (2013.01); *G09G 2340/0471* (2013.01); *G09G 2340/0478* (2013.01); *G09G 2354/00* (2013.01)

(58) Field of Classification Search
CPC ........ G09G 2340/0478; G09G 2354/00; G06F 3/14; G06F 9/54
USPC ......................................................... 345/522
See application file for complete search history.

(56) References Cited

U.S. PATENT DOCUMENTS

| | | | |
|---|---|---|---|
| 2019/0164518 A1* | 5/2019 | Dimitrov | ............... G09G 5/393 |
| 2021/0248957 A1* | 8/2021 | Lee | ...................... G09G 3/3225 |
| 2022/0165191 A1* | 5/2022 | Yao | ........................ G09G 5/006 |
| 2022/0377349 A1 | 11/2022 | Otsuka | |
| 2023/0169928 A1* | 6/2023 | Eun | ..................... G09G 3/3233 |
| | | | 345/204 |

FOREIGN PATENT DOCUMENTS

| | | | |
|---|---|---|---|
| CN | 113630572 A | 11/2021 | |
| CN | 113703937 A | 11/2021 | |
| CN | 113760080 A | 12/2021 | |
| WO | 2021065633 A1 | 4/2021 | |

\* cited by examiner

FRAME RATE SWITCHING METHOD AND APPARATUS

CROSS-REFERENCE TO RELATED APPLICATIONS

This application is a national stage of International Application No. PCT/CN2022/117946 filed on Sep. 8, 2022, which claims priority to Chinese Patent Application No. 202111645845.2 filed on Dec. 29, 2021 and Chinese Patent Application No. 202210191911.1 filed on Feb. 28, 2022. The disclosures of the aforementioned applications are hereby incorporated by reference in their entireties.

TECHNICAL FIELD

Embodiments of this application relate to the field of terminal technologies, and in particular, to a frame rate switching method and apparatus.

BACKGROUND

With the development of electronic devices, especially terminal devices, users can view more and more types of content through a display of terminal devices. When much content is displayed on a display, a user can slide on the display to view relevant content.

In some scenarios, to reduce system load or improve user experience (for example, increasing a frame rate in a gaming scenario can improve user experience), a terminal device needs to switch a frame rate (decrease or increase a frame rate). However, in a frame rate switching process, a sliding speed of an image frame may fluctuate in display, which in turn leads to screen freezing and poor user experience.

SUMMARY

Embodiments of this application provide a frame rate switching method and apparatus to solve the problem of sliding speed fluctuation of an image frame caused by frame rate switching when an electronic device displays an image frame.

According to a first aspect, an embodiment of this application provides a frame rate switching method. The method includes: drawing and rendering, by an application thread, a first image frame at a frame interval corresponding to a first frame rate in a first period; drawing and rendering, by the application thread, a second image frame at a frame interval corresponding to a second frame rate in a second period; triggering, by a system, a compositing thread to transmit a first frame-rate-switching request to a hardware composer in a third period; and switching, by the hardware composer, a frame rate from the first frame rate to the second frame rate in response to the first frame-rate-switching request so that the second image frame is displayed at the second frame rate.

The second period is preceded by the first period, and the second frame rate is different from the first frame rate.

In addition, the third period is preceded by the second period, or the third period coincides with the second period.

The method can be applied to an electronic device, and the electronic device can switch from the first frame rate to the second frame rate according to this method.

The second frame rate may be higher than the first frame rate, or the second frame rate is lower than the first frame rate. The second frame rate and the first frame rate may be in an integer multiple relationship or a non-integer multiple relationship.

The system may be a program other than an application of the electronic device.

Alternatively, in S103, the electronic device may trigger the compositing thread to transmit the first frame-rate-switching request to the hardware composer in the third period.

The drawing and rendering, by an application thread, a first image frame at a frame interval corresponding to a first frame rate in a first period may mean drawing and rendering, by the application thread, the first image frame at the frame interval corresponding to the first frame rate at a proper time within the first period. This application does not limit in which time segment of the first period the application thread draws and renders the first image frame.

Similarly, the drawing and rendering, by the application thread, a second image frame at a frame interval corresponding to a second frame rate in a second period may mean drawing and rendering, by the application thread, the second image frame at the frame interval corresponding to the second frame rate at a proper time within the second period. This application does not limit in which time segment of the second period the application thread draws and renders the second image frame.

It can be understood that in time intervals of the first period, the second period, and the third period, switching from the first frame rate to the second frame rate has not been implemented so that the frame rate is still the first frame rate, but drawing and rendering the second image frame at the frame interval corresponding to the second frame rate starts in advance from the second period.

That the second period is preceded by the first period may specifically mean that a start moment of the second period is later than an end moment of the first period, or that a start moment of the second period coincides with an end moment of the first period.

That the third period coincides with the second period may mean that a start moment of the third period coincides with a start moment of the second period and that an end moment of the third period also coincides with an end moment of the second period.

The triggering, by a system, a compositing thread to transmit a first frame-rate-switching request to a hardware composer in a third period may be specifically: transmitting, by the compositing thread, the first frame-rate-switching request to the hardware composer after it is determined that frame rate switching is required.

In this application, the image frame is drawn and rendered in advance at the frame interval corresponding to the second frame rate, and the system triggers the compositing thread to notify the hardware composer to implement frame rate switching, so that the image frame drawn and rendered at the frame interval corresponding to the second frame rate can be displayed at the second frame rate. In this way, a speed in image frame drawing and rendering can match a frame rate in display, so that image frames do not experience sliding speed fluctuation during display.

In a possible implementation, the triggering, by a system, a compositing thread to transmit a first frame-rate-switching request to a hardware composer in a third period includes: calling, by the system, a function setDesiredDisplayModeSpecs of a composer process through inter-process communication so that the compositing thread transmits the first frame-rate-switching request to the hardware composer in the third period, where the compositing thread is a main thread of the composer process.

The system herein may also be referred to as a system service. The system service may be a display manager service (DisplayManagerService, DMS) of a Java layer, and mainly performs display (display) policy control. The DMS transmits a switched-to state to an SF composer process.

The DMS transmits a message to a binder thread of the SF composer through inter-process binder communication. The binder thread of the composer executes the function setDesiredDisplayModeSpecs, and then wakes up the main thread to execute a function setActiveMode (for buffering a frame rate switching setting instruction). For a next frame, a main thread of the SF composer calls a function performSetActiveMode to notify the thread Vsync and the hardware composer (hwcomposer, HWC) thread to implement frame rate switching.

In a possible implementation, the triggering, by a system, a compositing thread to transmit a first frame-rate-switching request to a hardware composer in a third period includes: triggering, by the system in a case that a pop-up window is displayed on a display screen, the compositing thread to transmit the first frame-rate-switching request to the hardware composer in the third period.

That a pop-up window is displayed on a display screen may mean that a pop-up window is displayed on a display screen of the electronic device.

In a possible implementation, the triggering, by a system, a compositing thread to transmit a first frame-rate-switching request to a hardware composer thread in a third period includes: calling, by the compositing thread, a function performSetActiveMode in the third period to wake up the hardware composer thread to switch a frame rate from the first frame rate to the second frame rate.

In the embodiment of this application, the compositing thread can wake up, by calling a dedicated function, the hardware composer to control frame rate switching.

After being awoken, the hardware composer can control a hardware integration unit to implement frame rate switching, so that the hardware integration unit switches from the first frame rate to the second frame rate, thereby implementing frame rate switching in hardware.

In a possible implementation, the method further includes: triggering, by the system, the compositing thread to transmit a second frame-rate-switching request to a thread Vsync in a fourth period; and transmitting, by the thread Vsync, a Vsync message at the second frame rate in response to the second frame-rate-switching request.

The fourth period is preceded by the second period, or the fourth period coincides with the second period.

In a possible implementation, the transmitting, by the compositing thread, a second frame-rate-switching request to a thread Vsync in a fourth period includes: calling, by the compositing thread, a function setDuration in the fourth period to set a period parameter corresponding to the second frame rate for the thread Vsync, so that the thread Vsync transmits the Vsync message at the second frame rate, thereby implementing frame rate switching in software.

In this embodiment of this application, the compositing thread can also implement frame rate switching on the thread Vsync by calling a dedicated function, so that the Vsync message is transmitted at the new second frame rate.

When one buffer is accumulated in the buffer queue, the third period is preceded by the second period, and the third period is adjacent to the second period. When more than one buffer is accumulated in the buffer queue, the third period is preceded by the second period, but the third period is not adjacent to the second period. In other words, a specific time interval is between the third period and the second period. In addition, more buffers in the buffer queue mean a longer time interval between the third period and the second period.

In a possible implementation, in a case that 0 buffers are accumulated in a buffer queue corresponding to the application thread, the third period coincides with the second period.

In a case that 0 buffers are accumulated in the buffer queue, the application thread draws and renders the image frame and the compositing thread transmits the first frame-rate-switching request to the hardware composer thread in a same period (both in the second period).

The relationship between the fourth period and the second period is also related to the number of buffers accumulated in the buffer queue corresponding to the application thread.

In a possible implementation, when N buffers are accumulated in a buffer queue corresponding to the application thread, the fourth period is preceded by the second period, where N is an integer greater than or equal to 1.

When one buffer is accumulated in the buffer queue, the fourth period is preceded by the second period, and the fourth period is adjacent to the second period. When more than one buffer is accumulated in the buffer queue, the fourth period is preceded by the second period, but the fourth period is not adjacent to the second period. In other words, a specific time interval is between the fourth period and the second period. In addition, more buffers accumulated in the buffer queue mean a longer time interval between the fourth period and the second period.

In a possible implementation, in a case that 0 buffers are accumulated in a buffer queue corresponding to the application thread, the fourth period coincides with the second period.

In a case that 0 buffers are accumulated in the buffer queue, the application thread draws and renders the image frame and the compositing thread transmits the second frame-rate-switching request to the thread Vsync in a same period (both in the second period).

In a possible implementation, before the drawing and rendering, by the application thread, a second image frame at a second frame rate in a second period, the method further includes: receiving, by the application thread, a first Vsync message from the thread Vsync, where the first Vsync message carries the frame interval corresponding to the second frame rate.

In this application, because the first Vsync message carries the frame interval corresponding to the second frame rate, after receiving the first Vsync message, the application thread can draw and render the second image frame at the frame interval corresponding to the second frame rate in the second period.

In a possible implementation, the receiving, by the application thread, a first Vsync message from the thread Vsync includes:
  receiving, by the application thread, the first Vsync message from the thread Vsync at a start moment of the second period.

The thread Vsync transmits the first Vsync message to the application thread at the start moment of the second period, so that the application thread can receive the first Vsync message at the start moment of the second period to obtain the frame interval data carried in the first Vsync message, and then draw and render the second image frame at the frame interval carried in the first Vsync message.

In a possible implementation, before the receiving, by the application thread, a first Vsync message from the thread Vsync, the method further includes: transmitting, by the compositing thread, a frame interval modification notification message to the thread Vsync; and generating, by the thread Vsync, the first Vsync message in response to the frame interval modification notification message.

The frame interval modification notification message is used for notifying the compositing thread to modify, when the first Vsync message is generated, a frame interval to the frame interval corresponding to the second frame rate.

In a possible implementation, before the transmitting, by the compositing thread, a frame interval modification notification message to the thread Vsync, the method further includes: obtaining, by the compositing thread, a VsyncID of a first image frame from a frame interval array in the first period, where the VsyncID of the first image frame is a latest VsyncID currently stored in the frame interval array, and the frame interval array stores a plurality of VsyncIDs and frame intervals corresponding to the plurality of VsyncIDs respectively; and generating, by the compositing thread, the frame interval modification notification message based on the VsyncID of the first image frame.

The compositing thread may generate the frame interval modification notification message based on the VsyncID of the first image frame. The frame interval notification message is used for notifying the thread Vsync to modify, when a Vsync message corresponding to a VsyncID after a next VsyncID, namely the first Vsync message, is generated, a frame interval to the frame interval corresponding to the second frame rate. In other words, after the thread Vsync receives the frame interval modification notification message, a frame interval in the first Vsync message generated thereafter is the frame interval corresponding to the second frame rate.

In a possible implementation, before the transmitting, by the compositing thread, a first frame-rate-switching request to a hardware composer in a third period, the method further includes: determining, by the compositing thread, a next period for compositing the first image frame as the third period.

In a possible implementation, the compositing thread determines a next period as the third period when determining, based on a VsyncID corresponding to an image frame, that a current to-be-composited image frame is the first image frame.

Specifically, during image frame compositing, the compositing thread may identify an image frame based on a VsyncID corresponding to the image frame, determine the next period for compositing the first image frame as the third period when determining that a current to-be-composited image frame is the first image frame, and transmit the first frame-rate-switching request to the hardware composer in the third period.

The VsyncID of the first image frame herein is obtained by the compositing thread from the frame interval array.

Specifically, if the VsyncID corresponding to the first image frame is 1, the compositing thread may obtain a frame interval array {1, frame interval corresponding to the first frame rate} in the first period. Therefore, the compositing thread determines whether a VsyncID corresponding to a current to-be-composited image frame is 1 during image frame compositing. If it is found that a VsyncID corresponding to a current to-be-composited image frame is 1, the next period is determined as the third period.

In a possible implementation, before the transmitting, by the compositing thread, a second frame-rate-switching request to a thread Vsync in a fourth period, the method further includes: determining, by the compositing thread, a next period for compositing the first image frame as the fourth period.

Specifically, during image frame compositing, the compositing thread may identify an image frame based on a VsyncID corresponding to the image frame, determine the next period for compositing the first image frame as the fourth period when determining that a current to-be-composited image frame is the first image frame, and transmit the first frame-rate-switching request to the hardware composer in the fourth period.

Specifically, if the VsyncID corresponding to the first image frame is 1, the compositing thread may obtain a frame interval array {1, frame interval corresponding to the first frame rate} in the first period. Therefore, the compositing thread determines whether a VsyncID corresponding to a current to-be-composited image frame is 1 during image frame compositing. If it is found that a VsyncID corresponding to a current to-be-composited image frame is 1, the next period is determined as the fourth period.

The first period, the second period, and the third period correspond to the first frame rate that has not been switched. Therefore, the time intervals between the first period, the second period, and the third period are all the same as the frame interval corresponding to the first frame rate in terms of magnitude.

In a possible implementation, time intervals between the first period, the second period, and the fourth period are all the same as the frame interval corresponding to the first frame rate in terms of magnitude.

According to a second aspect, an embodiment of this application provides an electronic device. The electronic device may also be referred to as a terminal (terminal), user equipment (user equipment, UE), a mobile station (mobile station, MS), a mobile terminal (mobile terminal, MT), or the like. The electronic device may be a mobile phone (mobile phone), a smart television, a wearable device, a tablet computer (Pad), a computer having wireless transmitting and receiving functions, a virtual reality (virtual reality, VR) electronic device, an augmented reality (augmented reality, AR) electronic device, a wireless terminal in industrial control (industrial control), a wireless terminal in self driving (self-driving), a wireless terminal in remote medical surgery (remote medical surgery), a wireless terminal in smart grid (smart grid), a wireless terminal in transportation safety (transportation safety), a wireless terminal in smart city (smart city), a wireless terminal in smart home (smart home), and the like.

The electronic device includes a processor, and the processor is configured to call a computer program in a memory to perform the method according to the first aspect.

According to a third aspect, an embodiment of this application provides a computer-readable storage medium. The computer-readable storage medium stores computer instructions, and when the computer instructions are run on an electronic device, the electronic device is enabled to perform the method according to the first aspect.

According to a fourth aspect, an embodiment of this application provides a computer program product. When a computer program is run, an electronic device is enabled to perform the method according to the first aspect.

According to a fifth aspect, an embodiment of this application provides a chip. The chip includes a processor, and the processor is configured to call a computer program in a memory to perform the method according to the first aspect.

It should be understood that the second aspect to the fifth aspect of this application correspond to the first aspect of this application in terms of technical solution. Beneficial effects obtained by these aspects and corresponding feasible implementations are similar. Details are not repeated herein again.

DETAILED DESCRIPTION OF EMBODIMENTS

Figure 1:
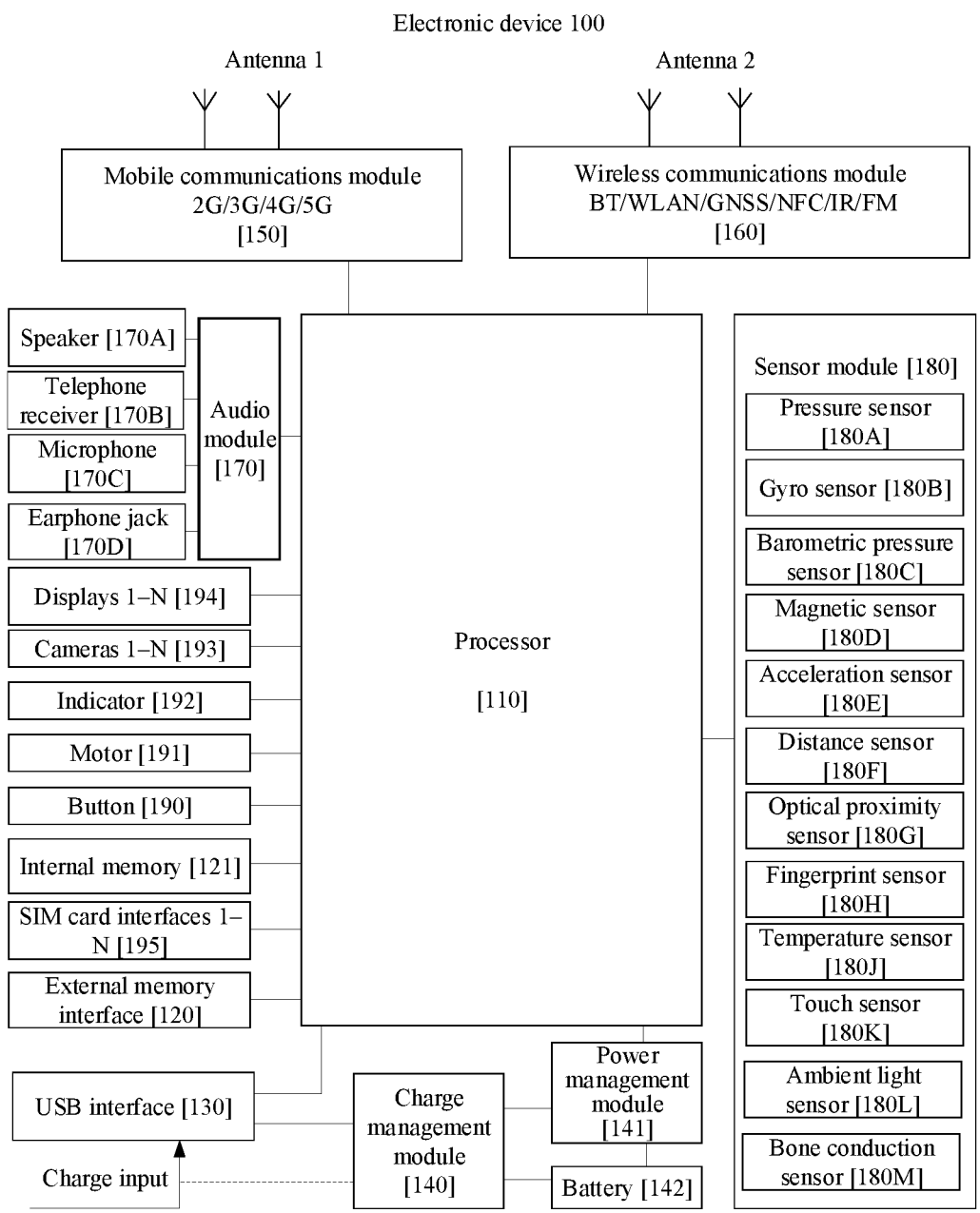
FIG. 1 is a schematic structural diagram of a hardware system of a terminal device according to an embodiment of this application.

To clearly describe technical solutions in embodiments of this application, terms such as "first" and "second" are used in the embodiments of this application to distinguish between same items or similar items that have basically the same functions or purposes. For example, a first chip and a second chip are merely intended to distinguish between different chips, but not to limit a sequential order thereof. A person skilled in the art may understand that the terms such as "first" and "second" do not limit a quantity and an execution sequence, and the terms such as "first" and "second" do not indicate a definite difference.

It should be noted that in the embodiments of this application, terms such as "an example" or "for example" are used to indicate an example, an illustration, or an explanation. Any embodiment or design solution described by using "an example" or "for example" in this application should not be construed as being more preferred or advantageous than other embodiments or design solutions. To be precise, the terms such as "an example" or "for example" are intended to present a related concept in a specific manner.

In the embodiments of this application, "at least one" means one or more, and "a plurality of" means two or more. The term "and/or" describes an association relationship between associated objects, and indicates that three relationships may exist. For example, A and/or B may represent the following cases: only A, both A and B, and only B, where A and B may be singular or plural. The character "/" generally indicates an "or" relationship between associated objects before and after the character. "At least one of the following items (objects)" or a similar expression means any combination of these items, including a single item (object) or any combination of a plurality of items (objects). For example, at least one of a, b, or c may indicate: a, b, c, a and b, a and c, b and c, or a, b, and c, where a, b, and c may be singular or plural.

The frame rate switching method provided in the embodiments of this application can be applied to an electronic device having a display function.

The electronic device includes a terminal device. The electronic device may also be referred to as a terminal (terminal), user equipment (user equipment, UE), a mobile station (mobile station, MS), a mobile terminal (mobile terminal, MT), or the like. The electronic device may be a mobile phone (mobile phone), a smart television, a wearable device, a tablet computer (Pad), a computer having wireless transmitting and receiving functions, a virtual reality (virtual reality, VR) electronic device, an augmented reality (augmented reality, AR) electronic device, a wireless terminal in industrial control (industrial control), a wireless terminal in self driving (self-driving), a wireless terminal in remote medical surgery (remote medical surgery), a wireless terminal in smart grid (smart grid), a wireless terminal in transportation safety (transportation safety), a wireless terminal in smart city (smart city), a wireless terminal in smart home (smart home), and the like. The embodiments of this application do not limit a specific technology or a specific device form of the electronic device.

For better understanding of the embodiments of this application, a structure of the electronic device in the embodiments of this application is described below.

FIG. 1 is a schematic structural diagram of an electronic device 100. The electronic device 100 may include a processor 110, an external memory interface 120, an internal memory 121, a universal serial bus (universal serial bus, USB) interface 130, a charge management module 140, a power management module 141, a battery 142, an antenna 1, an antenna 2, a mobile communications module 150, a wireless communications module 160, an audio module 170, a loudspeaker 170A, a telephone receiver 170B, a microphone 170C, an earphone jack 170D, a sensor module 180, a button 190, a motor 191, an indicator 192, a camera 193, a display 194, a subscriber identification module (subscriber identification module, SIM) card interface 195, and the like. The sensor module 180 may include a pressure sensor 180A, a gyro sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, a touch sensor 180K, an ambient light sensor 180L, a bone conduction sensor 180M, and the like.

It can be understood that the structure illustrated in this embodiment of this application does not constitute a specific limitation on the electronic device 100. In some other embodiments of this application, the electronic device 100 may include more or fewer components than shown in the figure, or combine some components, or split some components, or have a different component arrangement. The components shown in the figure may be implemented by using hardware, software, or a combination of software and hardware.

The processor 110 may include one or more processing units. For example, the processor 110 may include an application processor (application processor, AP), a modem processor, a graphics processing unit (graphics processing unit, GPU), an image signal processor (image signal processor, ISP), a controller, a video codec, a digital signal processor (digital signal processor, DSP), a baseband processor, a neural-network processing unit (neural-network processing unit, NPU), and/or the like. Different processing units may be separate devices or may be integrated into one or more processors.

The controller may generate an operation control signal according to an instruction operation code and a timing signal to complete control of instruction fetching and execution.

The processor 110 may be further provided with a memory for storing instructions and data. In some embodiments, the memory in the processor 110 is a cache memory. The memory may store instructions or data just used or repeatedly used by the processor 110. If the processor 110 needs to use the instructions or the data again, the processor 110 may call the instructions or the data from the memory. This avoids repeated access and reduces waiting time of the processor 110, thereby improving system efficiency.

In some embodiments, the processor 110 may include one or more interfaces. The interface may include an inter-integrated circuit (inter-integrated circuit, I2C) interface, an inter-integrated circuit sound (inter-integrated circuit sound, I2S) interface, a pulse code modulation (pulse code modulation, PCM) interface, a universal asynchronous receiver/transmitter (universal asynchronous receiver/transmitter, UART) interface, a mobile industry processor interface (mobile industry processor interface, MIPI), a general-purpose input/output (general-purpose input/output, GPIO) interface, a subscriber identity module (subscriber identity module, SIM) interface, a universal serial bus (universal serial bus, USB) interface, and/or the like.

The I2C interface is a bidirectional synchronous serial bus and includes a serial data line (serial data line, SDA) and a serial clock line (derail clock line, SCL).

The I2S interface may be used for audio communication. In some embodiments, the processor 110 may include a plurality of groups of I2S buses. The processor 110 may be coupled to the audio module 170 through an I2S bus to implement communication between the processor 110 and the audio module 170.

The PCM interface may also be used for audio communication to sample, quantize, and encode an analog signal. In some embodiments, the audio module 170 and the wireless communications module 160 may be coupled by using a PCM bus interface.

The UART interface is a universal serial data bus used for asynchronous communication. The bus may be a bidirectional communications bus that switches transmission of to-be-transmitted data between serial communication and parallel communication.

The MIPI interface may be configured to connect the processor 110 to the display 194, the camera 193, and other peripheral devices. The MIPI interface includes a camera serial interface (camera serial interface, CSI), a display serial interface (display serial interface, DSI), and the like. In some embodiments, the processor 110 communicates with the camera 193 by using the CSI interface, thereby implementing a shooting function of the electronic device 100. The processor 110 communicates with the display 194 by using the DSI interface, thereby implementing a display function of the electronic device 100.

The GPIO interface may be configured through software. The GPIO interface may be configured as a control signal or a data signal.

The USB interface 130 is an interface that complies with the USB standard specification, and specifically may be a Mini USB interface, a Micro USB interface, a USB Type C interface, or the like.

It may be understood that an interface connection relationship between the modules illustrated in the embodiments of this application is an example for description, and constitutes no limitation on the structure of the electronic device 100. In some other embodiments of this application, the electronic device 100 may alternatively use an interface connection manner different from that in the foregoing embodiment, or a combination of a plurality of interface connection manners.

The charge management module 140 is configured to receive charge input from a charger. The charger may be a wireless charger or a wired charger.

The power management module 141 is configured to connect the battery 142, the charge management module 140, and the processor 110.

A wireless communication function of the electronic device 100 may be implemented by using the antenna 1, the antenna 2, the mobile communications module 150, the wireless communications module 160, the modem processor, the baseband processor, and the like.

The antenna 1 and the antenna 2 are configured to transmit and receive electromagnetic wave signals. The antenna of the electronic device 100 may be configured to cover one or more communication bands. Different antennas may be further multiplexed to increase antenna utilization.

The mobile communications module 150 may provide a wireless communication solution including 2G/3G/4G/5G and the like to be applied to the electronic device 100. The mobile communications module 150 may include at least one filter, a switch, a power amplifier, a low noise amplifier (low noise amplifier, LNA), and the like. The modem processor may include a modulator and a demodulator. The modulator is configured to modulate a low frequency baseband signal that is to be sent into a medium or high frequency signal. The demodulator is configured to demodulate a received electromagnetic wave signal into a low frequency baseband signal.

The wireless communications module 160 may provide a wireless communication solution applied to the electronic device 100 and including a wireless local area network (wireless local area networks, WLAN) (for example, wireless fidelity (wireless fidelity, Wi-Fi) network), Bluetooth (bluetooth, BT), global navigation satellite system (global navigation satellite system, GNSS), frequency modulation (frequency modulation, FM), near field communication (near field communication, NFC), infrared (infrared, IR), and the like. The wireless communications module 160 may be one or more devices integrating at least one communication processing module. The wireless communications module 160 receives an electromagnetic wave by using the antenna 2, performs frequency modulation and filtering processing on the electromagnetic wave signal, and transmits the processed signal to the processor 110.

In some embodiments, in the electronic device 100, the antenna 1 is coupled to the mobile communications module 150, and the antenna 2 is coupled to the wireless communications module 160, so that the electronic device 100 can communicate with a network and other devices by using a wireless communications technology. The wireless communications technology may include global system for mobile communications (global system for mobile communications, GSM), general packet radio service (general packet radio service, GPRS), code division multiple access (code division multiple access, CDMA), wideband code division multiple access (wideband code division multiple access, WCDMA), time-division code division multiple access (time-division code division multiple access, TD-SCDMA), long term evolution (long term evolution, LTE), BT, GNSS, WLAN, NFC, FM, IR technology, and/or the like. The GNSS may include the global positioning system (global positioning system, GPS), the global navigation satellite system (global navigation satellite system, GLONASS), the Beidou navigation satellite system (beidou navigation satellite system, BDS), the quasi-zenith satellite system (quasi-zenith satellite system, QZ SS), and/or the satellite based augmentation systems (satellite based augmentation systems, SBAS).

The electronic device 100 implements a display function by using the GPU, the display 194, the application processor, and the like. The GPU is an image processing microprocessor and is connected to the display 194 and the application processor. The GPU is configured to perform mathematical and geometric computation graphics rendering. The processor 110 may include one or more GPUs that execute program instructions to generate or change display information.

The display 194 is configured to display an image or a video, receive a sliding operation, and the like. The display 194 includes a display panel. The display panel may be a liquid crystal display (liquid crystal display, LCD), an organic light-emitting diode (organic light-emitting diode, OLED), an active-matrix organic light emitting diode (active-matrix organic light emitting diode, AMOLED), a flexible light-emitting diode (flex light-emitting diode, FLED), a Miniled, a MicroLed, a Micro-oLed, a quantum dot light emitting diode (quantum dot light emitting diodes, QLED), and the like. In some embodiments, the electronic device 100 may include one or N displays 194, where N is a positive integer greater than 1.

The electronic device 100 may implement a shooting function by using the ISP, the camera 193, the video codec, the GPU, the display 194, the application processor, and the like.

The ISP is configured to process data fed back by the camera 193. For example, during photographing, a shutter is open, allowing light to be transmitted to a photosensitive element of the camera through a lens. An optical signal is converted into an electrical signal. The photosensitive element of the camera transfers the electrical signal to the ISP for processing, so as to convert the electrical signal into an image visible to the naked eye.

The camera 193 is configured to capture a static image or a video. An optical image of an object is generated by using a lens and is projected to a photosensitive element. The photosensitive element may be a charge coupled device (charge coupled device, CCD) or a complementary metal-oxide semiconductor (complementary metal-oxide semiconductor, CMOS) phototransistor. The photosensitive element converts an optical signal into an electrical signal, and then transfers the electrical signal to the ISP which converts the signal into a digital image signal.

The digital signal processor is configured to process digital signals, including not only digital image signals but also other digital signals. For example, when the electronic device 100 selects a frequency, the digital signal processor is configured to perform Fourier transform and the like on frequency energy.

The video codec is configured to compress or decompress a digital video. The electronic device 100 can support one or more types of video codecs, so that the electronic device 100 can play or record videos in a plurality of coding formats such as moving picture experts group (moving picture experts group, MPEG) 1, MPEG2, MPEG3, and MPEG4.

The NPU is a neural-network (neural-network, NN) computing processor. By referring to a structure of a biological neural network, for example, a transmission mode between neurons in a human-brain, the NPU quickly processes input information and is also capable of continuous self-learning. Applications such as intelligent cognition of the electronic device 100, for example, image recognition, face recognition, speech recognition, and text understanding, can be implemented by using the NPU.

The external memory interface 120 may be configured to connect an external storage card, for example, a micro SD card, to extend a storage capacity of the electronic device 100. The external memory card communicates with the processor 110 by using the external memory interface 120 to implement a data storage function. For example, files such as music and video files are stored in the external storage card.

The internal memory 121 may be configured to store computer executable program code, where the executable program code includes instructions. The internal memory 121 may include a storage program area and a storage data area. The program storage area may store an operating system, an application program required by at least one function (for example, a sound playing function or an image playing function), and the like. The data storage area may store data (such as audio data and a phone book) and the like that are created during use of the electronic device 100. In addition, the internal memory 121 may include a high-speed random access memory, and may further include a non-volatile memory, for example, at least one magnetic disk storage device, a flash memory device, and a universal flash storage (universal flash storage, UFS). By running the instructions stored in the internal memory 121 and/or the instructions stored in the memory that is provided in the processor, the processor 110 executes various functional applications and data processing of the electronic device 100.

The electronic device 100 may use the audio module 170, the speaker 170A, the telephone receiver 170B, the microphone 170C, the earphone jack 170D, the application processor, and the like to implement an audio function, for example, music playing and sound recording.

The audio module 170 is configured to convert digital audio information into an analog audio signal for output, and is also configured to convert analog audio input into a digital audio signal. The audio module 170 may be further configured to encode and decode audio signals.

The speaker 170A, also referred to as a "loudspeaker", is configured to convert audio electrical signals into sound signals. The electronic device 100A may be used for listening to music or answering a hands-free call by using the loudspeaker 170A.

The telephone receiver 170B, also referred to as an "earpiece", is configured to convert audio electrical signals into sound signals. When the electronic device 100 receives a call or a voice message, the telephone receiver 170B may be placed near a human ear for listening to a voice.

The microphone 170C, also referred to as a "mic" or "mike", is configured to convert sound signals into electrical signals. When making a call or sending a voice message, a user may input a sound signal into the microphone 170C by speaking close to the microphone 170C. At least one microphone 170C may be provided in the electronic device 100.

The earphone jack 170D is configured to connect a wired earphone. The earphone jack 170D may be the USB interface 130, or may be a 3.5 mm open mobile terminal platform (open mobile terminal platform, OMTP) standard interface, or a cellular telecommunications industry association of the USA (cellular telecommunications industry association of the USA, CTIA) standard interface.

The pressure sensor 180A is configured to sense a pressure signal, and can convert the pressure signal into an electrical signal. In some embodiments, the pressure sensor 180A may be disposed on the display 194. There are many types of pressure sensors 180A, such as a resistive pressure sensor, an inductive pressure sensor, and a capacitive pressure sensor. The capacitive pressure sensor may include at least two parallel plates having a conductive material. When a force is applied to the pressure sensor 180A, capacitance between electrodes changes.

The gyro sensor 180B may be configured to determine a motion posture of the electronic device 100. In some embodiments, an angular velocity of the electronic device 100 around three axes (namely, x, y, and z axes) may be determined by using the gyro sensor 180B.

The barometric pressure sensor 180C is configured to measure atmospheric pressure. In some embodiments, the electronic device 100 calculates an altitude based on an atmospheric pressure value measured by the barometric pressure sensor 180C to assist positioning and navigation.

The magnetic sensor 180D includes a Hall sensor. The electronic device 100 can detect opening and closing of a clamshell or a smart cover by using the magnetic sensor 180D. In some embodiments, when the electronic device 100 is a clamshell device, the electronic device 100 may detect opening and closing of a clamshell by using the magnetic sensor 180D. Then, a feature such as automatic unlocking upon opening of the clamshell is set based on a detected opening or closing state of the smart cover or a detected opening or closing state of the clamshell.

The acceleration sensor 180E may detect magnitudes of accelerations of the electronic device 100 in various directions (generally along three axes), and may detect a magnitude and direction of gravity when the electronic device 100 is static.

The distance sensor 180F is configured to measure a distance. The electronic device 100 may measure a distance by using infrared or a laser. In some embodiments, in a shooting scenario, the electronic device 100 may use the distance sensor 180F to measure a distance for rapid focusing.

The optical proximity sensor 180G may include, for example, a light emitting diode (LED) and an optical detector, for example, a photodiode. The light-emitting diode may be an infrared light-emitting diode. The electronic device 100 emits infrared light outward by using the light-emitting diode.

The ambient light sensor 180L is configured to sense brightness of ambient light. The electronic device 100 may adaptively adjust brightness of the display 194 based on the sensed brightness of the ambient light.

The fingerprint sensor 180H is configured to collect fingerprints. The electronic device 100 may implement fingerprint unlock, application access lock, fingerprint photographing, fingerprint-based call answering, and the like by using characteristics of the collected fingerprint.

The temperature sensor 180J is configured to perform temperature detection. In some embodiments, the electronic device 100 executes a temperature handling policy by using a temperature detected by the temperature sensor 180J.

The touch sensor 180K is also referred to as a "touch device". The touch sensor 180K may be disposed on the display 194, and the touch sensor 180K and the display 194 form a touchscreen, also referred to as a "touch screen". The touch sensor 180K is configured to detect a touch operation performed on or near the touch sensor 180K. The touch sensor may transfer a detected touch operation to the application processor to determine a touch event type. A visual output related to the touch operation may be provided by using the display 194. In some other embodiments, the touch sensor 180K may alternatively be disposed on a surface of the electronic device 100, or disposed in a position different from the display 194.

The bone conduction sensor 180M may obtain a vibration signal. In some embodiments, the bone conduction sensor 180M may obtain a vibration signal generated when a human voice vibrates a bone.

The key 190 includes a power on/off key, a volume key, and the like. The key 190 may be a mechanical key, or may be a touch key. The electronic device 100 may receive key input and generate key signal input related to user setting and function control of the electronic device 100.

The motor 191 may generate vibration alerts. The motor 191 may be configured to provide a vibration alert for an incoming call, and may also be configured to provide a vibration feedback for a touch.

The indicator 192 may be an indicator lamp and may be configured to indicate a state of charge and power change, and may also be configured to indicate a message, a missed call, a notification, and the like.

The SIM card interface 195 is configured to connect a SIM card. The SIM card may be inserted into the SIM card interface 195 or pulled out of the SIM card interface 195 to achieve contact with or separation from the electronic device 100.

A software system of the electronic device 100 may use a layered architecture, an event-driven architecture, a microkernel architecture, a microservice architecture, a cloud architecture, or the like. In the embodiments of this application, a software structure of the electronic device 100 is described by using an android (android) system with a layered architecture as an example.

Figure 2:
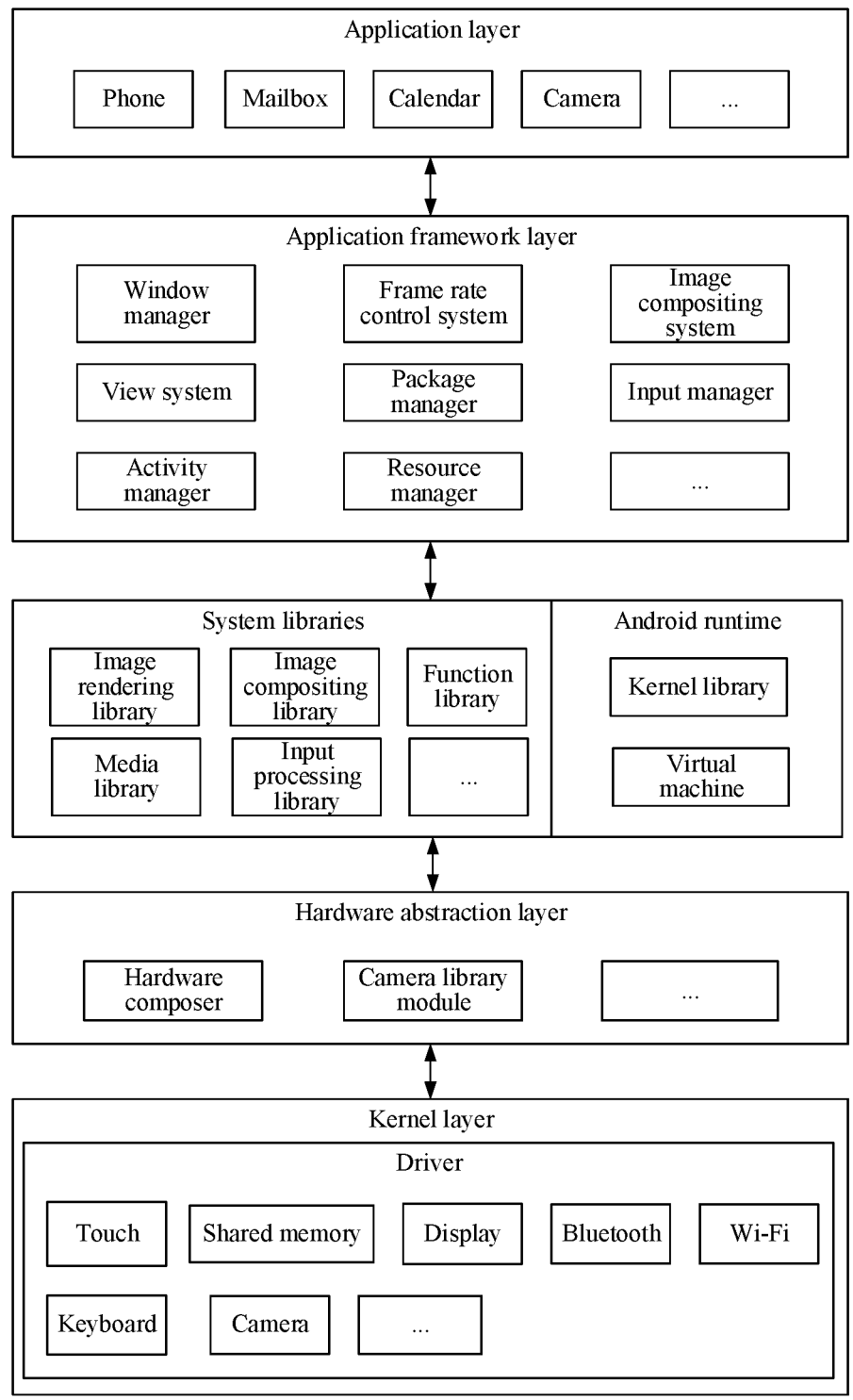
FIG. 2 is a schematic structural diagram of a software system of a terminal device according to an embodiment of this application.

FIG. 2 is a structural block diagram of software of an electronic device according to an embodiment of this application.

In a layered architecture, software is divided into several layers, and each layer has clear roles and responsibilities. The layers communicate with each other through software interfaces. In some embodiments, an android system is divided into five layers: an application layer, an application framework layer, android runtime (Android runtime) and system libraries, a hardware abstraction layer, and a kernel layer from top to bottom.

The application layer may include a series of application program packages.

As shown in FIG. 2, the application program package may include application programs such as phone, mailbox, calendar, and camera.

The application framework layer provides an application programming interface (application programming interface, API) and a programming framework for application programs at the application layer. The application framework layer includes some predefined functions.

As shown in FIG. 2, the application framework layer may include a window manager, a frame rate control system, an image compositing system, a view system, a package manager, an input manager, an activity manager, a resource manager, and the like.

The window manager is used to manage window programs. The window manager may obtain a display size, determine whether there is a status bar, lock a screen, capture a screen, and the like.

The frame rate control system is used to adjust a screen refresh rate.

The image compositing system is used to control image compositing and generate a vertical synchronization (vertical synchronization, Vsync) signal.

The image compositing system includes a compositing thread, a thread Vsync, and a buffer queue (queue buffer) thread. The compositing thread is used to be woken by a Vsync signal to perform compositing. The thread Vsync is used to generate a next Vsync signal in response to a Vsync signal request. The buffer queue thread is used to store a buffer, generate a Vsync signal request, wake up the compositing thread, and the like.

The view system includes visual controls, such as controls with text displayed and controls with a picture displayed. The view system may be used to build an application program. A display screen may include one or more views. For example, a display screen including a messaging notification icon may include a view displaying text and a view displaying a picture.

The package manager is used for program management in a system, for example, application program installation, uninstallation and upgrade.

The input manager is a program for managing input devices. For example, an input system can determine input operations such as a mouse click operation, a keyboard input operation, and a touch sliding.

The activity manager is used to manage lifecycle and navigation and rollback functions of various application programs, and is responsible for creating an android main thread and maintaining lifecycle of application programs.

The resource manager provides various resources for the application programs, such as a localized character string, an icon, a picture, a layout file, and a video file.

The android runtime includes a core library and a virtual machine. The android runtime is responsible for scheduling and managing an Android system.

The core libraries include functional functions that the java language needs to call and core libraries of Android.

The application layer and the application framework layer run on the virtual machine. The virtual machine executes java files of the application layer and the application framework layer as binary files. The virtual machine is configured to perform functions such as object lifecycle management, stack management, thread management, security and exception management, and garbage collection.

The system libraries may include a plurality of functional modules, for example, an image rendering library, an image compositing library, a function library, a media library, and an input processing library.

The image rendering library is configured to render a two-dimensional or three-dimensional image. The image compositing library is configured to composite a two-dimensional or three-dimensional image.

In a possible implementation, an application draws and renders an image by using the image rendering library, and then the application transmits the image drawn and rendered to a buffer queue of the image compositing system. Each time when a Vsync signal arrives, the image compositing system (for example, surface flinger) obtains one to-be-composited frame of image from the buffer queue by order, and then the image compositing library performs image compositing.

The function library provides macros, type definitions, string manipulation functions, mathematical calculation functions, input and output functions, and the like used in the C language.

The media library supports playback and recording of audio and videos in a plurality of commonly used formats as well as static image files. The media library may support a plurality of audio and video encoding formats, such as MPEG4, H.264, MP3, AAC, AMR, JPG, and PNG.

The input processing library is a library for processing input devices, and can process mouse, keyboard, touch, and other input.

The hardware abstraction layer may include multiple library modules, and the library modules may be a hardware composer (hwcomposer, HWC), a camera library module, and the like. The Android system may load the corresponding library modules for device hardware, thereby achieving a purpose of accessing the device hardware by the application framework layer. The device hardware may include, for example, an LCD display and a camera in the electronic device.

The kernel layer is a layer between hardware and software. The kernel layer includes at least a touch panel (touch panel, TP) driver, a display driver, a Bluetooth driver, a Wi-Fi driver, a keyboard driver, a shared memory driver, a camera driver, and the like.

The hardware may be an audio device, a Bluetooth device, a camera device, a sensor device, and the like.

Working processes of the software and hardware of the electronic device 100 are described below with reference to a scenario in which an application program is started or screen switching occurs in an application program.

When the touch sensor 180K in the touch panel receives a touch operation, the kernel layer processes the touch operation into a raw input event (including information such as touch coordinates, touch strength, and a timestamp of the touch operation). The raw input event is stored at the kernel layer. The kernel layer reports the raw input event to the input manager of the application framework layer through the input processing library. The input manager of the application framework layer parses out information (including an operation type, a reported point position, and the like) about the raw input event, determines a focus application based on a current focus, and transmits the information parsed out to the focus application. The focus may be a touch point in a touch operation or a click position in a mouse click operation. The focus application is an application running in the foreground of the electronic device or an application corresponding to the touch position in the touch operation. Based on the information (for example, the reported point position) about the raw input event, the focus application determines a control corresponding to the raw input event.

It is assumed that the touch operation is a sliding touch operation and a control corresponding to the sliding touch operation is a list control of the WeChat application. The WeChat application calls, by using the view system of the application framework layer, the image rendering library in the system library to draw and render an image. The WeChat application transmits the image rendered to a buffer queue of the image compositing system. Images drawn and rendered in the image compositing system are composited into the WeChat interface by using the image compositing library in the system library. With the display driver of the kernel layer, the image compositing system enables the corresponding interface of the WeChat application to be displayed on a screen (the display).

For ease of understanding, example descriptions of some concepts related to the embodiments of this application are provided for reference.

1. Frame: a single picture, the smallest unit, in screen display. A frame may be understood as a still picture. Quickly displaying multiple adjacent frames in succession can create an illusion of object movement. A frame rate is the number of picture frames refreshed in one second, and may also be understood as the number of picture frames refreshed by a graphics processing unit in an electronic device per second. A higher frame rate means smoother and more vivid animation. The more frames per second, and the smoother the displayed motion.

It should be noted that a frame generally needs to be subjected to processes such as drawing, rendering, and compositing before the frame is displayed on a screen.

2. Frame drawing: drawing a picture on a display screen. The display screen may include one or more views, and each view may be drawn by a visual control of the view system. Each view includes sub-views, and one sub-view corresponds to a widget in the view. For example, one of sub-views corresponds to one symbol in a picture view.

3. Frame rendering: coloring or adding a 3D effect on a drawn view. For example, the 3D effect may be lighting, shadow, texture, and other effects.

4. Frame compositing: a process of compositing a plurality of foregoing one or more rendered views into a display screen.

A display process of a screen of the electronic device 100 is described below with reference to software and hardware.

It should be noted that, to improve display smoothness and reduce phenomena such as display freezing, an electronic device generally implements display based on a Vsync signal to synchronize processes such as image drawing, rendering, compositing, and screen refresh display.

It can be understood that the Vsync signal is a periodic signal, and a Vsync signal period may be set based on a screen refresh rate. For example, when the screen refresh rate is 60 Hz, the Vsync signal period may be 16.6 ms, meaning that the electronic device generates a control signal every 16.6 ms to periodically trigger the Vsync signal.

It should be noted that Vsync signals may be classified into software Vsync signals and hardware Vsync signals. The software Vsync signal includes Vsync-APP and Vsync-SF. Vsync-APP is used to trigger a drawing and rendering process. Vsync-SF is used to trigger a compositing process. The hardware Vsync signal (Vsync-HW) is used to trigger a screen display refresh process.

Typically, the software Vsync signal and the hardware Vsync signal are synchronous in period. Switching between 60 Hz and 120 Hz is used as an example. If Vsync-HW switches from 60 Hz to 120 Hz, Vsync-APP and Vsync-SF switch synchronously from 60 Hz to 120 Hz.

Figure 3:
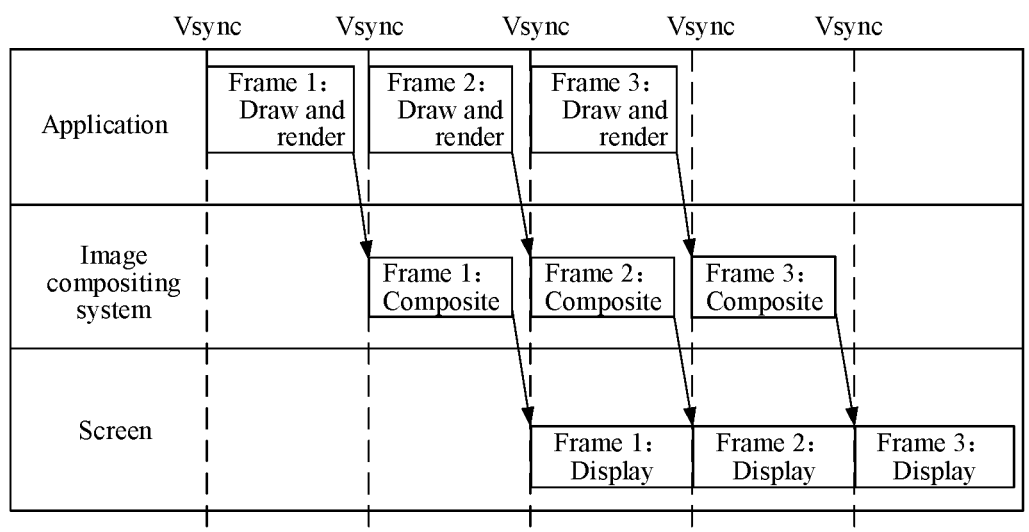
FIG. 3 is a schematic diagram of a screen display processing process of a terminal device according to a possible implementation.

For example, FIG. 3 is a schematic diagram of a screen display processing process of an electronic device according to a possible implementation. In chronological order, images displayed by the electronic device correspond to a frame 1, a frame 2, and a frame 3 in sequence.

Specifically, display of a frame 1 is used as an example. An application of the electronic device draws and renders the frame 1 through a view system of an application framework layer. After the drawing and rendering of the frame 1 is completed, the application of the electronic device transmits the frame 1 drawn and rendered to an image compositing system (for example, surface flinger). The image compositing system composites the rendered frame 1. After the frame 1 is composited, the electronic device may start a display driver by calling a kernel layer, to display content corresponding to the frame 1 on a screen (display). The frames 2 and 3 are also composited and displayed in a similar process to the frame 1. Details are not repeated herein again. In FIG. 3, for each frame, displaying lags behind drawing by two Vsync signal periods, and therefore the electronic device has a lag in image frame display.

In some cases, if system load of the electronic device is relatively large, freezing can be reduced by lowering a screen refresh rate of the electronic device. When the electronic device is in a video scenario with a static system screen and a low frame rate, power consumption can also be reduced by lowering the screen refresh rate of the electronic device. In scenarios with high user perception, for example, in-app sliding, application switching, and games, system fluency can be improved by increasing the refresh rate of the electronic device, so as to improve user experience.

The frame rate switching method in the embodiments of this application can be applied to various application scenarios of electronic devices. The application scenarios of the frame rate switching method in the embodiments of this application are described below with reference to the accompanying drawings.

Figure 4:
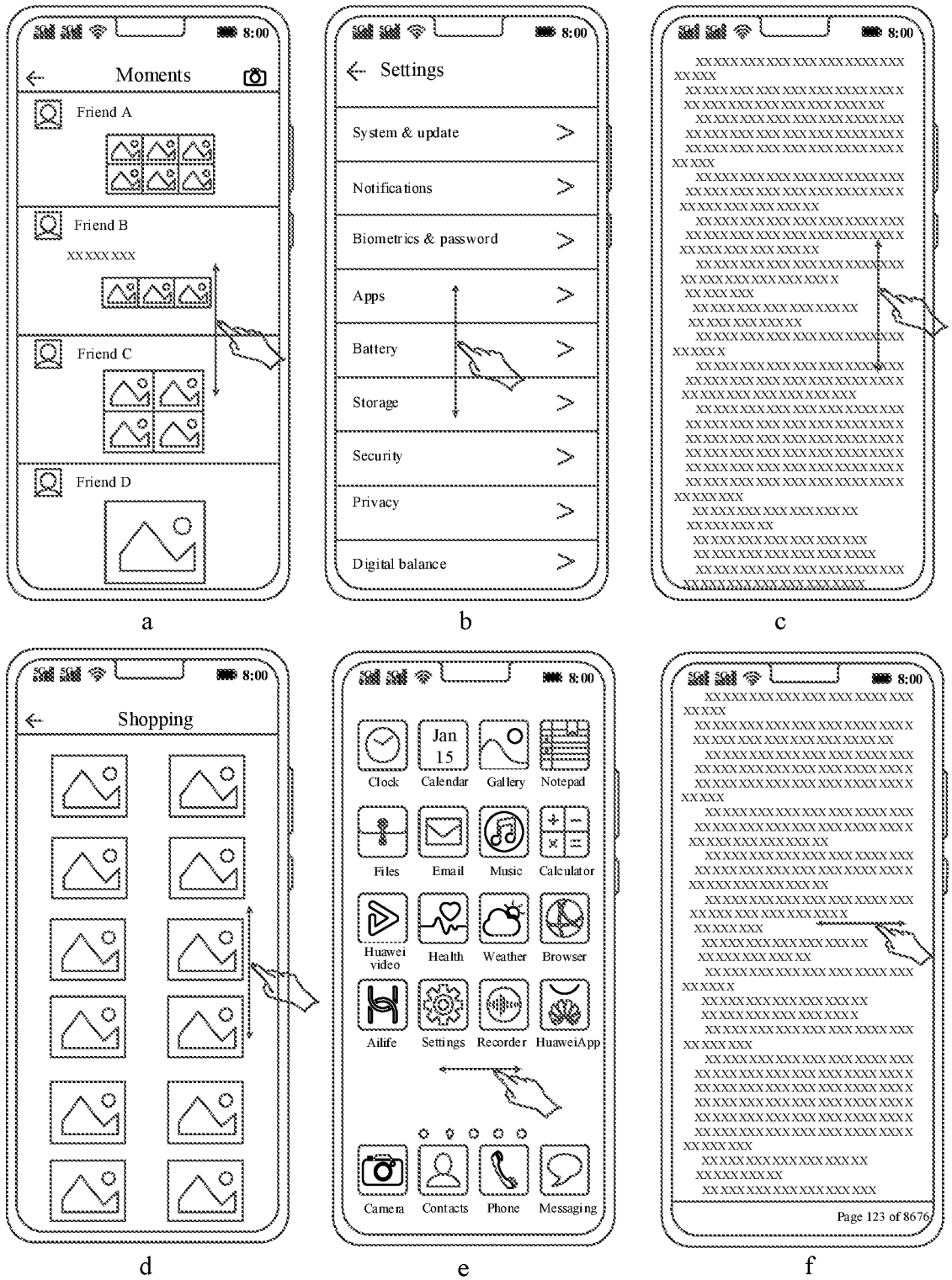
FIG. 4 is a schematic diagram of a screen display processing process corresponding to frame rate switching according to a possible implementation.

FIG. 4 is a schematic diagram of an application scenario according to an embodiment of this application.

An electronic device may receive a slide-up operation or a slide-down operation of a user on a screen such as a social application screen shown in a of FIG. 4, or a setting related screen shown in b of FIG. 4, or a document screen shown in c of FIG. 4, or a product browsing screen shown in d of FIG. 4. The electronic device may also receive a slide-left operation or a slide-right operation of a user on a screen shown in e of FIG. 4 or an electronic-book screen shown in f of FIG. 4. When the electronic device receives the sliding operation, the electronic device implements frame drawing, rendering, compositing and other processes in response to the sliding operation, and displays content corresponding to the sliding operation.

In the various sliding scenarios in FIG. 4, in some cases, after the user stops sliding, to lower the frame rate, the electronic device may switch from a current frame rate to a lower frame rate to reduce power consumption of the electronic device.

In a traditional solution, frame rate switching is generally implemented after a decision to implement frame rate switching is made, and a frame interval for image frame drawing and rendering is changed only after frame rate switching is completed. As a result, an original frame interval is still used for some image frames during drawing and rendering, but these image frames have switched to a new frame rate during display, causing speed fluctuation in display of these image frames and hence screen freezing, and leading to poor user experience.

A frame rate switching process of an electronic device in a traditional solution is briefly described with reference to FIG. 5.

Figure 5:
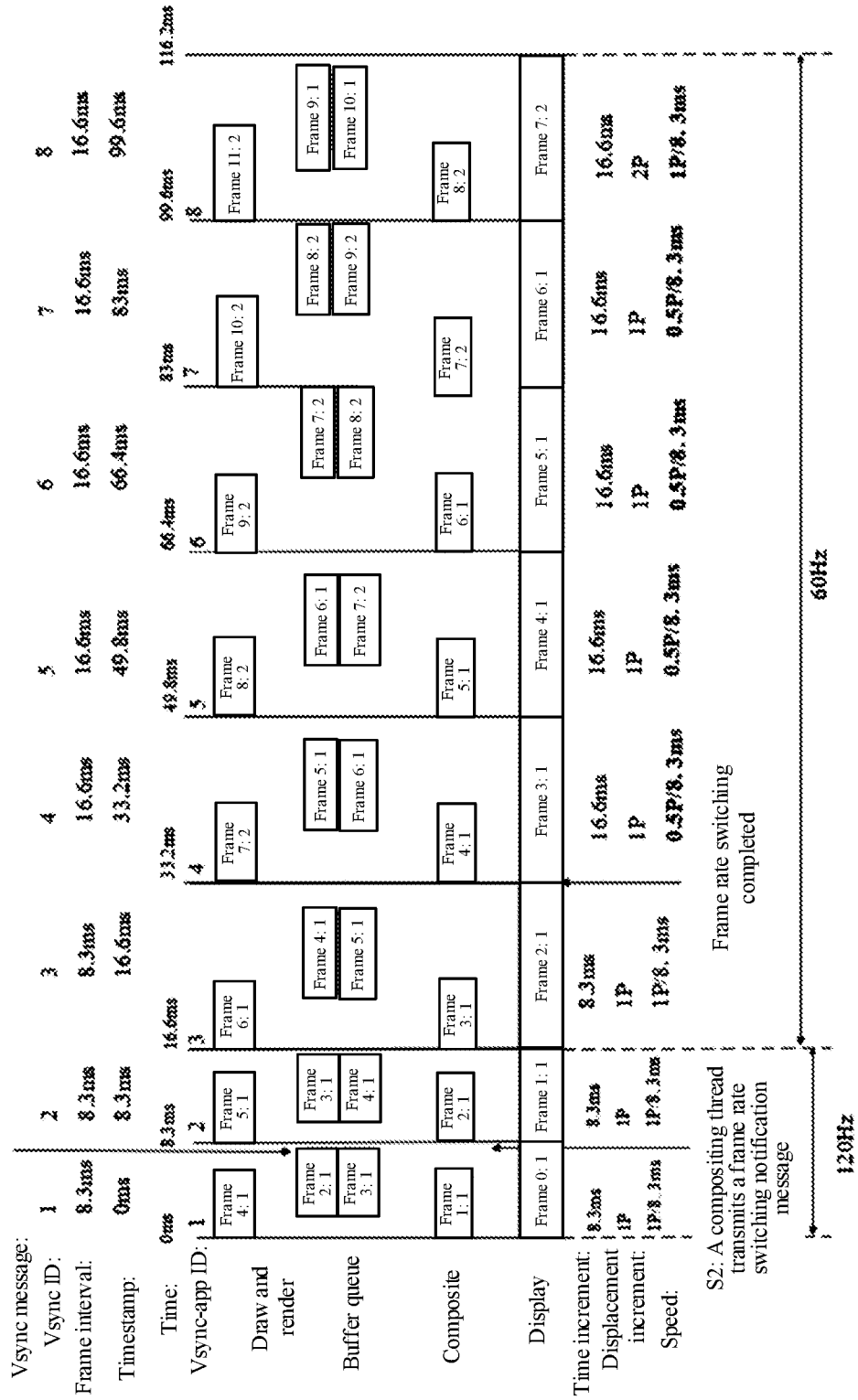
FIG. 5 is a schematic diagram of a screen display processing process according to a possible implementation.

In an example of FIG. 5, the electronic device is to switch a frame rate from 120 Hz to 60 Hz. At 0 ms to 8.3 ms, a compositing thread decides to implement frame rate switching. After two periods (8.3 ms to 16.6 ms and 16.6 ms to 33.2 ms), the electronic device has switched the frame rate from 120 Hz to 60 Hz at 33.2 ms.

The frame rate switching process shown in FIG. 5 mainly includes steps S1 and S2, and these two steps are briefly described below.

S1. A main application thread transmits a frame rate switching request message to the compositing thread.

The frame rate switching request carries a target frame rate and a process identifier (process ID, PID) of a current frame.

The target frame rate is a frame rate to which the electronic device requests to switch. As shown in FIG. 5, the main application thread transmits the frame rate switching request message to the compositing thread in the period of 0 ms to 8.3 ms. The current frame rate of the electronic device is 120 Hz, and the electronic device needs to switch from the current frame rate to a target frame rate of 60 Hz, so the target frame rate carried in the frame rate switching request is 60 Hz.

In addition, the PID in the frame rate switching request message is used to identify a corresponding process. For example, if the electronic device currently displays a screen of a game, the PID in the frame rate switching request message is used to identify a relevant process of the game.

S2. The compositing thread transmits a frame rate switching notification message to a thread Vsync.

As shown in FIG. 5, after receiving the frame rate switching request message from the main application thread, the compositing thread determines that the target frame rate is 60 Hz, and therefore determines to switch a frame rate from the current 120 Hz to 60 Hz, and transmits a frame rate switching notification message to a hardware composer and the thread Vsync in the period of 0 ms to 8.3 ms to switch from the current frame rate to the target frame rate.

Through the above process, the frame rate switching is completed at 33.2 ms.

After the compositing thread transmits the frame rate switching notification message, it takes two periods (8.3 ms to 16.6 ms and 16.6 ms to 33.2 ms) for the frame rate switching to complete. As shown in FIG. 5, the electronic device has completed frame rate switching at 33.2 ms. At this point, frequency of Vsync signals for a hardware integration unit and software has also switched to 60 Hz.

Specifically, after the compositing thread receives the frame rate switching request message from the main application thread at 0 ms to 8.3 ms, the compositing thread determines to implement frame rate switching, and then transmits the frame rate switching notification message to the hardware composer, so that the hardware composer controls a hardware integration circuit to switch a frame rate from 120 Hz to 60 Hz. The hardware integration circuit completes frame rate switching at 33.2 ms.

In addition, the compositing thread also transmits the frame rate switching notification message to the thread Vsync, to notify the thread Vsync to switch a software period to a new period during 16.6 ms to 33.2 ms (the new period corresponds to the new frame rate 60 Hz) to complete frequency switching. After frame rate switching is completed, a new timing time is set for a timer based on a timestamp of 16.6 ms and a new frame interval (the frame interval corresponding to 60 Hz is 16.6 ms), so that the timer wakes up the thread Vsync based on the new timing time (a timing time matching the target frame rate).

The following analyzes why a display speed of an image frame fluctuates in the frame rate switching process in FIG. 5.

As shown in FIG. 5, the electronic device has completed the frame rate switching from 120 Hz to 60 Hz at 33.2 ms. For a frame 7, a frame interval used for drawing and rendering has been modified to 2 pixels, a displacement during display has been modified to 2 pixels, and a corresponding time interval for display is 16.6 ms. Therefore, a sliding speed when the frame 7 is displayed is 2 pixels/16.6 ms=1 pixel/8.3 ms.

For a frame 6, because a frame interval used for drawing and rendering is 8.3 ms, a rendering displacement is 1 pixel, and a displacement increment when the frame 6 is displayed is also 1 pixel, but a corresponding time interval for display is 16.6 ms. Therefore, a sliding speed when the frame 6 is displayed is 1 pixel/16.6 ms=0.5 pixel/8.3 ms. Similarly, a sliding speed when a frame 3 to a frame 5 are displayed is also 0.5 pixel/8.3 ms.

For a frame 2, because frame rate switching has not been implemented during drawing and rendering, a frame interval used for drawing and rendering the frame 2 is still 8.3 ms, a rendering displacement is 1 pixel, a displacement increment during display is 1 pixel, and a corresponding time interval for display is 8.3 ms. Therefore, a sliding speed when the frame 2 is displayed is 2 pixels/16.6 ms=1 pixel/ 8.3 ms. Similarly, a sliding speed when a frame 0 and a frame 1 are displayed is also 2 pixels/16.6 ms=1 pixel/8.3 ms.

As shown in FIG. 5, a sliding speed when each image frame is displayed is as follows:

The sliding speeds when the frame 0 to the frame 2 are displayed are all 1 pixel/8.3 ms, the sliding speeds when the frame 3 to the frame 6 are displayed are all 0.5 pixel/8.3 ms, and the sliding speed when the frame 7 is displayed is 1 pixel/8.3 ms.

Therefore, a sliding speed fluctuates in a process from completing display of the frame 2 to starting display of the frame 3 (the speed is reduced from 1 pixel/8.3 ms to 0.5 pixel/8.3 ms), and a speed fluctuates in a process from completing display of the frame 6 to starting display of the frame 7 (the speed is increased from 0.5 pixel/8.3 ms to 1 pixel/8.3 ms). In other words, before and after switching the frame rate from 120 Hz to 60 Hz, the sliding speed of the image frame is decreased first and then increased, experiencing speed fluctuation.

Therefore, as shown in FIG. 5, in the frame rate switching process of the electronic device, a rendering displacement of some frames during drawing and rendering is different from a display displacement during display (or a frame interval used in drawing and rendering is different from a time interval corresponding to display), or in the traditional solution, frame rate switching is implemented in a way that an application rendering frame rate, a compositing frame rate, and a hardware device frame rate are changed at the same time (three Vsyncs are changed simultaneously). Due to buffer accumulation of Android, a buffer rendered at an old frame rate is displayed at a new frame rate. Therefore, sliding speed fluctuation is caused when an image frame is displayed in a frame rate switching process, such that screen freezing is perceived by users, leading to poor user experience.

The frame rate switching process in FIG. 5 is to switch from 120 Hz to 60 Hz, and the frame rates before and after switching are in an integer multiple relationship. Actually, in a frame rate switching process of the traditional solution, a display speed of an image frame fluctuates not only in a case that the frame rates before and after switching are in an integer multiple relationship but also in a case that the frame rates before and after switching are in a non-integer multiple relationship. For better understanding of a switching process in a case that the frame rates before and after switching are in a non-integer multiple relationship, the following briefly describes the case that the frame rates before and after frame rate switching are in a non-integer multiple relationship in the traditional solution.

Figure 6:
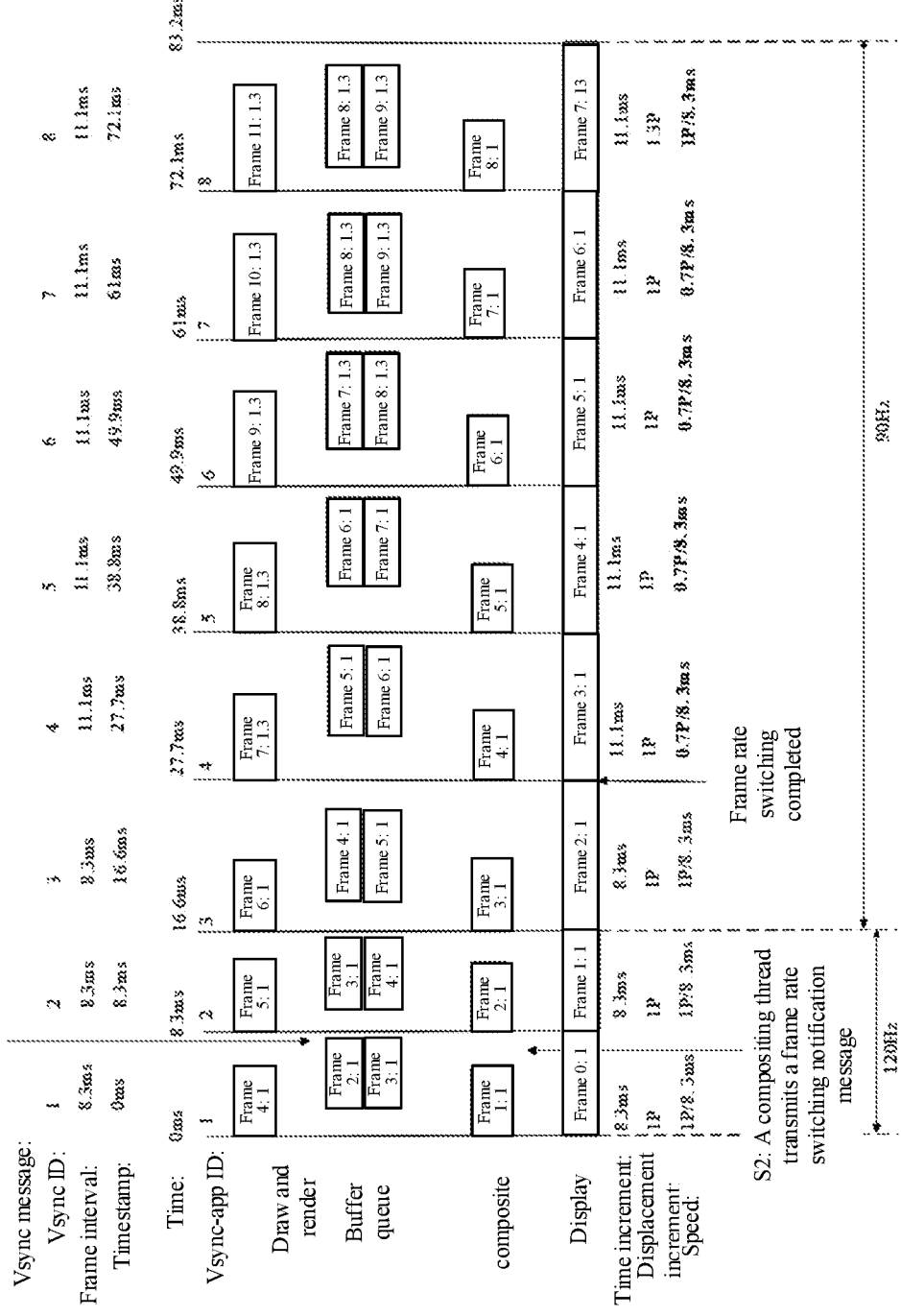
FIG. 6 is a schematic diagram of screen display according to a possible implementation.

As shown in FIG. 6, an electronic device is to switch a frame rate from 120 Hz to 90 Hz. At 0 ms to 8.3 ms, a compositing thread decides to implement frame rate switching. After two periods (8.3 ms to 16.6 ms and 16.6 ms to 27.7 ms), the electronic device has switched the frame rate from 120 Hz to 90 Hz at 27.7 ms.

The frame rate switching process shown in FIG. 6 mainly includes steps S1 and S2, and these two steps are briefly described below.

S1. A main application thread initiates a frame rate switching request message to the compositing thread.

The frame rate switching request carries a target frame rate and a PID of a current frame.

As shown in FIG. 6, the main application thread transmits the frame rate switching request message to the compositing thread in the period of 0 ms to 8.3 ms. The current frame rate of the electronic device is 120 Hz, and the electronic device needs to switch from the current frame rate to a target frame rate of 90 Hz, so the target frame rate carried in the frame rate switching request is 90 Hz.

S2. The compositing thread transmits a frame rate switching notification message to a thread Vsync.

As shown in FIG. 6, after the compositing thread receives the frame rate switching request message from the main application thread, the compositing thread determines, based on the target frame rate of 90 Hz carried in the frame rate switching request, to switch a frame rate from current 120 Hz to 90 Hz, and transmits the frame rate switching notification message to a hardware composer and the thread Vsync in the period of 0 ms to 8.3 ms to switch from the current frame rate to the target frame rate.

Through the above process, the frame rate switching is completed at 27.7 ms.

After the compositing thread transmits the frame rate switching notification message, it takes two periods (8.3 ms to 16.6 ms and 16.6 ms to 27.7 ms) for the frame rate switching to complete. Therefore, in FIG. 6, frame rate switching is completed at 27.7 ms. At this point, frequency of Vsync signals for a hardware integration unit and software has also switched to 60 Hz.

Specifically, after the compositing thread receives the frame rate switching request message from the main application thread at 0 ms to 8.3 ms, the compositing thread determines to implement frame rate switching, and then transmits the frame rate switching notification message to the hardware composer, so that the hardware composer controls a hardware integration circuit to switch a frame rate from 120 Hz to 60 Hz. The hardware integration circuit completes frame rate switching at 27.7 ms.

In addition, the compositing thread also transmits the frame rate switching notification message to the thread Vsync, to notify the thread Vsync to switch a software period to a new period during 16.6 ms to 27.7 ms (the new period corresponds to the new frame rate 90 Hz) to complete frequency switching. After frame rate switching is completed, a new timing time is set for a timer based on a timestamp of 16.6 ms and a new frame interval (the frame interval corresponding to 90 Hz is 11.1 ms), so that the timer wakes up the thread Vsync based on the new timing time (a timing time matching the target frame rate).

As shown in FIG. 6, a sliding speed when each image frame is displayed may be obtained through the following calculation:

The sliding speeds when the frame 0 to the frame 2 are displayed are all 1 pixel/8.3 ms, the sliding speeds when the frame 3 to the frame 6 are displayed are all 0.7 pixel/8.3 ms, and the sliding speed when the frame 7 is displayed is 1 pixel/8.3 ms.

Therefore, a sliding speed fluctuates in a process from completing display of the frame 2 to starting display of the frame 3 (the speed is reduced from 1 pixel/8.3 ms to 0.7 pixel/8.33 ms), and a speed fluctuates in a process from completing display of the frame 6 to starting display of the frame 7 (the speed is increased from 0.7 pixel/8.3 ms to 1 pixel/8.33 ms). In other words, before and after the frame rate is switched from 120 Hz to 90 Hz, the speed of the image frame is decreased first and then increased, experiencing speed fluctuation.

To sum up, it can be learned from FIG. 5 and FIG. 6 that in the traditional solution, a sliding speed when an image frame is displayed fluctuates in a frame rate switching process.

To resolve the problem in the processes shown in FIG. 5 and FIG. 6, the embodiments of this application provide a new frame rate switching method. In this solution, a frame interval used in drawing and rendering an image frame is adjusted in advance, and the image frame whose frame interval is adjusted in advance is displayed at a switched-to frame rate, so that a sliding speed when the image frame is displayed does not fluctuate, thereby improving user experience. Specifically, in the frame rate switching method of this embodiment of this application, the frame interval used in drawing and rendering the image frame is adjusted in advance, and an occasion for frame rate switching is determined by tracking a frameNumber of the image frame, so that the image frame whose frame interval used in drawing and rendering is adjusted in advance can be displayed at the switched-to frame rate, and finally a sliding speed when the image frame is displayed does not fluctuate.

Figure 7:
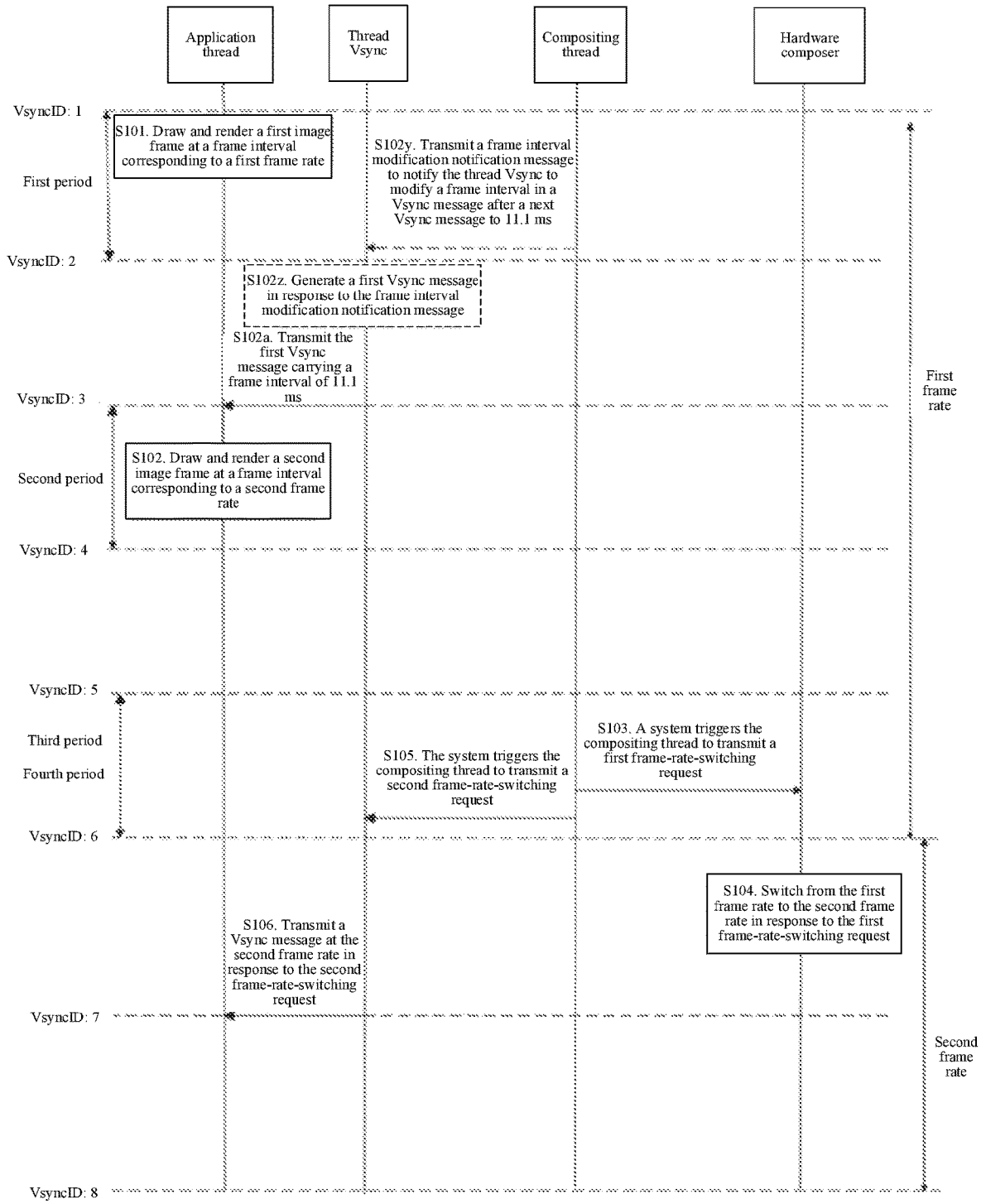
FIG. 7 is a schematic diagram of a frame rate switching process of a frame rate switching method according to an embodiment of this application.

The following details the frame rate switching method in the embodiments of this application with reference to FIG. 7. The frame rate switching method in FIG. 7 may be implemented by an electronic device. As shown in FIG. 7, a frame rate of the electronic device at VsyncID=1 to VsyncID=6 is a first frame rate, a frame rate thereof at VsyncID=6 to VsyncID=8 is a second frame rate, and each moment corresponds to one VsyncID.

The method in FIG. 7 includes steps S101 to S104, and the four steps are all detailed below.

S101. An application thread draws and renders a first image frame at a frame interval corresponding to the first frame rate in a first period.

S102. The application thread draws and renders a second image frame at a frame interval corresponding to the second frame rate in a second period.

The frame intervals corresponding to the first frame rate and the second frame rate may be obtained by taking reciprocals of the first frame rate and the second frame rate, respectively. For example, if the first frame rate is 120 Hz, the frame interval corresponding to the first frame rate is 8.3 ms; and if the second frame rate is 90 Hz, the frame interval corresponding to the second frame rate is 11.1 ms.

As shown in FIG. 7, the second period is preceded by the first period, and the second frame rate is different from the first frame rate. It can be understood that although in FIG. 7, the second period is preceded by the first period and the second period is not adjacent to the first period, actually, this application only defines that the second period is preceded by the first period, but does not limit whether the second period and the first period are adjacent. The second period and the first period may or may not be adjacent to each other.

It can be understood that the first frame rate may be a frame rate before switching, and the second frame rate may be a frame rate after switching. For example, if the electronic device switches from 120 Hz to 90 Hz, the first frame rate may be 120 Hz, and the second frame rate may be 90 Hz. In this case, in S101, the application thread draws and renders the first image frame at the frame interval of 8.3 ms corresponding to 120 Hz in the first period, and in S102, the application thread draws and renders the second image frame at the frame interval of 11.1 ms corresponding to 90 Hz in the second period.

S103. A system triggers a compositing thread to transmit a first frame-rate-switching request to a hardware composer in a third period.

The system may be a program other than an application of the electronic device.

Alternatively, in S103, the electronic device may trigger the compositing thread to transmit the first frame-rate-switching request to the hardware composer in the third period.

The third period may be preceded by the second period, or the third period coincides with the second period.

As shown in FIG. 7, the third period is preceded by the second period, and the third period and the second period are not adjacent.

It can be understood that in S103, the system rather than the application may determine to initiate the frame rate switching request, so that frame rate switching can be initiated more flexibly to implement frame rate switching.

The system herein may alternatively be the compositing thread. To be specific, the compositing thread can directly determine whether to implement frame rate switching, and after determining to implement frame rate switching, the compositing thread may transmit the first frame-rate-switching request to the hardware composer.

In step S103, specifically, the system may call a function setDesiredDisplayModeSpecs of a composer process through inter-process communication so that the compositing thread transmits the first frame-rate-switching request to the hardware composer in the third period, where the compositing thread is a main thread of the composer process.

In step S103, the system may determine, based on a status of the electronic device, whether to implement frame rate switching, and after determining to implement frame rate switching, trigger the compositing thread to transmit the first frame-rate-switching request to the hardware composer in the third period.

Optionally, step S103 specifically includes: triggering, by the system in a case that a pop-up window is displayed on a display screen, the compositing thread to transmit the first frame-rate-switching request to the hardware composer in the third period.

That a pop-up window is displayed on a display screen may mean that a pop-up window is displayed on a display screen of the electronic device.

It can be understood that a buffer queue is correspondingly present when the application thread draws and renders an image frame, and the buffer queue may have a specific number of buffers.

Optionally, in a case that N buffers are accumulated in the buffer queue, the third period is preceded by the second period, where N is an integer greater than or equal to 1.

Optionally, in a case that 0 buffers are accumulated in the buffer queue, the third period coincides with the second period.

FIG. 7 shows a case in which two buffers are accumulated in the buffer queue. It can be learned from FIG. 7 that the third period is preceded by the second period and that the third period is not adjacent to the second period.

In S103, after being triggered by the system, the compositing thread may specifically call a function performSetActiveMode in the third period to wake up the hardware composer thread to switch a frame rate from the first frame rate to the second frame rate.

S104. The hardware composer switches from the first frame rate to the second frame rate in response to the first frame-rate-switching request, so that the second image frame is displayed at the second frame rate.

The hardware composer controls a hardware integration unit to switch from the first frame rate to the second frame rate in response to the first frame-rate-switching request. As shown in FIG. 7, the hardware composer controls the hardware integration unit to switch to the second frame rate at a moment corresponding to VsyncID=7.

In addition to controlling the hardware integrated unit to implement frame rate switching, the electronic device needs to control software to implement frame rate switching.

Optionally, in an embodiment, the method in FIG. 7 further includes the following steps:

S105. The system triggers the compositing thread to transmit a second frame-rate-switching request to a thread Vsync in a fourth period.

S106. The thread Vsync transmits a Vsync message at the second frame rate in response to the second frame-rate-switching request.

In S105, the fourth period is preceded by the second period, or the fourth period coincides with the second period. That is, the fourth period cannot precede the second period.

In S105, the compositing thread may control, by calling a corresponding function, the thread Vsync to transmit the Vsync message at the second frame rate.

Specifically, S105 specifically includes: calling, by the compositing thread, a function setDuration in the fourth period to set a period parameter corresponding to the second frame rate for the thread Vsync, so that the thread Vsync transmits the Vsync message at the second frame rate.

It can be understood that a buffer queue is correspondingly present when the application thread draws and renders an image frame, and the buffer queue may have a specific number of buffers.

Optionally, in a case that N buffers are accumulated in the buffer queue, the fourth period is preceded by the second period, where N is an integer greater than or equal to 1.

Optionally, in a case that 0 buffers are accumulated in the buffer queue, the fourth period also coincides with the second period.

In a case that both the third period and the fourth period coincide with the second period, that is, the third period and the fourth period coincide, steps S103 and S105 may be implemented in one period.

Optionally, in an embodiment, before step S102, the method in FIG. 7 further includes the following step:

S102a. The application thread receives a first Vsync message from the thread Vsync.

The first Vsync message frame carries the frame interval corresponding to the second frame rate.

For example, when the second frame rate is 90 Hz, the frame interval carried in the first Vsync message is 11.1 ms.

Step S102a specifically includes: receiving, by the application thread, the first Vsync message from the thread Vsync at a start moment of the second period.

To be specific, after receiving the first Vsync message in the second period, the application thread draws and renders the second image frame in the second period at a frame interval (the frame interval corresponding to the second frame rate) carried in the first Vsync message.

Optionally, in an embodiment, before step S102a, the method in FIG. 7 further includes:

S102y. The compositing thread transmits a frame interval modification notification message to the thread Vsync.

S102z. The thread Vsync generates the first Vsync message in response to the frame interval modification notification message.

The frame interval modification notification message is used for notifying the compositing thread to modify, when the first Vsync message is generated, a frame interval to the frame interval corresponding to the second frame rate.

Optionally, in an embodiment, before step S102y, the method in FIG. 7 further includes: obtaining, by the compositing thread, a VsyncID of a first image frame from a frame interval array in the first period, where the VsyncID of the first image frame is a latest VsyncID currently stored in the frame interval array, and the frame interval array stores a plurality of VsyncIDs and frame intervals corresponding to the plurality of VsyncIDs respectively; and generating, by the compositing thread, the frame interval modification notification message based on the VsyncID of the first image frame.

The compositing thread may generate the frame interval modification notification message based on the VsyncID of the first image frame. The frame interval notification message is used for notifying the thread Vsync to modify, when a Vsync message corresponding to a VsyncID after a next VsyncID, namely the first Vsync message, is generated, a frame interval to the frame interval corresponding to the second frame rate. In other words, after the thread Vsync receives the frame interval modification notification message, a frame interval in the first Vsync message generated thereafter is the frame interval corresponding to the second frame rate. If the second frame rate is 90 Hz, the frame interval in the first Vsync message is 11.1 ms.

FIG. 7 is used as an example. If the first frame rate is 120 Hz, a frame interval array obtained by the compositing thread in the first period is [{1,8.3}]. The frame interval array means that when the VsyncID is 1, a corresponding frame interval is 8.3 ms. After obtaining the frame interval array, the compositing thread may modify the frame interval in the first Vsync message corresponding to a VsyncID of 3 so that the frame interval carried in the first Vsync message is the frame interval corresponding to the second frame rate.

In this embodiment of this application, after the system determines to implement frame rate switching, the system may trigger the compositing thread to transmit a frame interval modification notification message to the thread Vsync.

Optionally, in an embodiment, step S102y specifically includes: triggering, by the system, the compositing thread to transmit the frame interval modification notification message to the thread Vsync in the first period.

In this embodiment of this application, after determining to implement frame rate switching, the system triggers the compositing thread to transmit the frame interval modification notification message to the thread Vsync in the first period, reserving sufficient time for the thread Vsync to modify the frame interval in the Vsync message.

Optionally, in an embodiment, before step S103, the method in FIG. 7 further includes the following step:

S103a. The compositing thread determines a next period for compositing the first image frame as the third period.

Specifically, in step S103a, the compositing thread may identify each image frame that needs compositing; when determining that the first image frame needs to be composited, determines the next period for compositing the first image frame as the third period; and implements step S103 in the third period.

Specifically, in step S103, during image frame compositing, the compositing thread may identify an image frame based on a VsyncID corresponding to the image frame, determine the next period for compositing the first image frame as the third period when determining that a current to-be-composited image frame is the first image frame, and transmit the first frame-rate-switching request to the hardware composer in the third period.

The VsyncID of the first image frame herein is obtained by the compositing thread from the frame interval array.

Specifically, if the VsyncID corresponding to the first image frame is 1, the compositing thread may obtain a frame interval array {1, frame interval corresponding to the first frame rate} in the first period. Therefore, the compositing thread determines whether a VsyncID corresponding to a current to-be-composited image frame is 1 during image frame compositing. If it is found that a VsyncID corresponding to a current to-be-composited image frame is 1, the next period is determined as the third period.

Optionally, in an embodiment, before the transmitting, by the compositing thread, a second frame-rate-switching request to a thread Vsync in a fourth period, the method further includes: determining, by the compositing thread, a next period for compositing the first image frame as the fourth period.

Specifically, during image frame compositing, the compositing thread may identify an image frame based on a VsyncID corresponding to the image frame, determine the next period for compositing the first image frame as the fourth period when determining that a current to-be-composited image frame is the first image frame, and transmit the first frame-rate-switching request to the hardware composer in the fourth period.

For example, if the first frame rate is 120 Hz, and the VsyncID corresponding to the first image frame is 1, the compositing thread may obtain a frame interval array {1, 8.3 ms} in the first period. Therefore, the compositing thread determines whether a VsyncID corresponding to a current to-be-composited image frame is 1 during image frame compositing. If it is found that a VsyncID corresponding to a current to-be-composited image frame is 1, the compositing thread determines the next period as the fourth period.

Optionally, in an embodiment, time intervals between the first period, the second period, and the third period are all the same as the frame interval corresponding to the first frame rate in terms of magnitude.

For example, when the first frame rate is 120 Hz, the time intervals of the first period, the second period, and the third period are all 8.3 ms in terms of magnitude.

Figure 8:
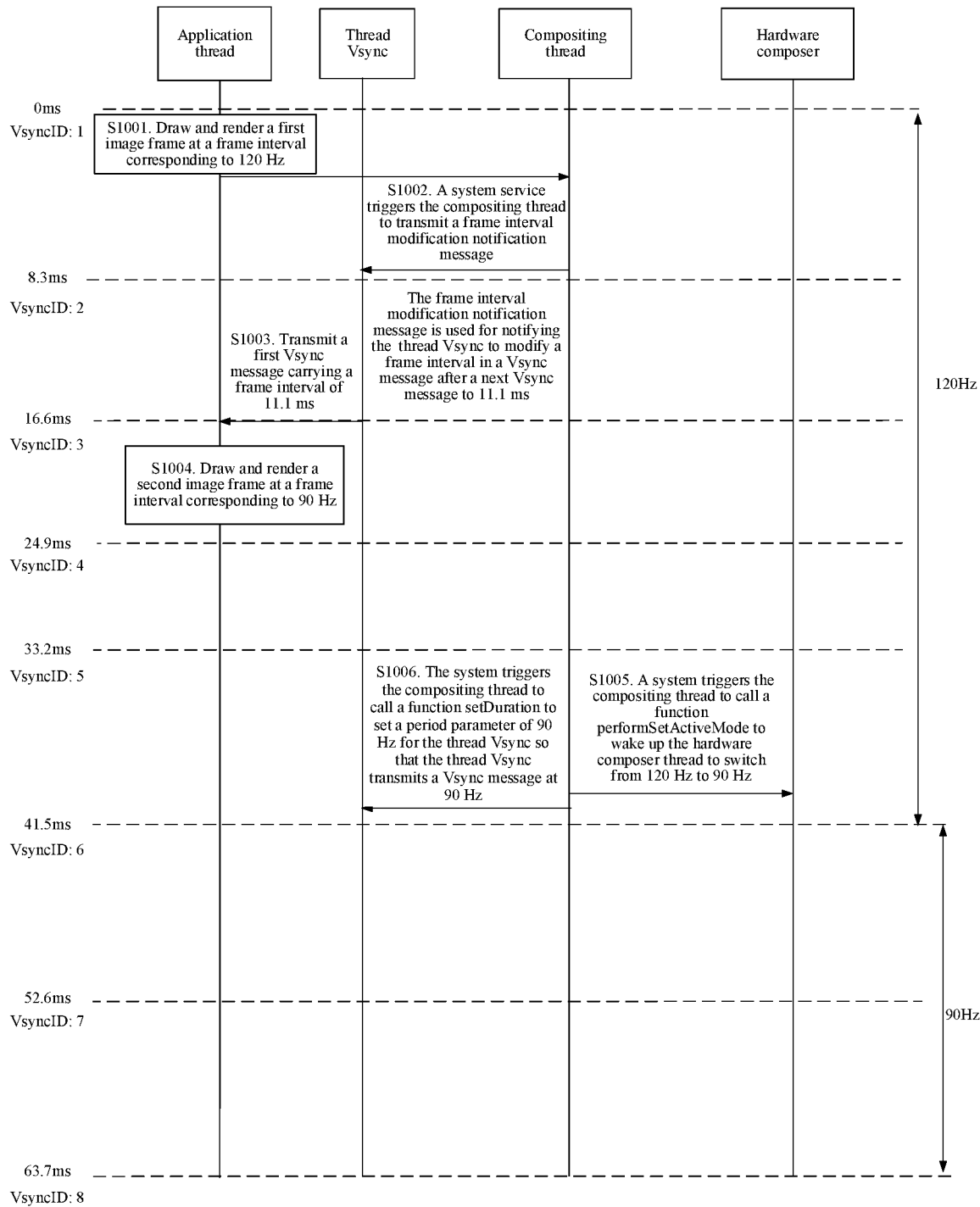
FIG. 8 is a schematic diagram of a frame rate switching process of a frame rate switching method according to an embodiment of this application.

With reference to FIG. 8, the following details the frame rate switching method in the embodiments of this application by using an example that an electronic device switches from 120 Hz to 90 Hz.

As shown in FIG. 8, a frame rate of the electronic device is 120 Hz at 0 ms to 41.5 ms, a frame rate thereof is 90 Hz at 41.5 ms to 63.7 ms, and each moment corresponds to one VsyncID. As shown in FIG. 8, a VsyncID corresponding to 0 ms is 1, a VsyncID corresponding to 8.3 ms is 2, and so on. At a moment corresponding to each VsyncID, an application thread receives a Vsync message from a thread Vsync, where the Vsync message carries a corresponding VsyncID and frame interval. After receiving the Vsync message, the application thread draws and renders a corresponding image frame at the frame interval carried in the Vsync message.

FIG. 8 includes steps S1001 to S1005, and these steps are detailed below.

S1001. The application thread draws and renders a first image frame at a frame interval corresponding to 120 Hz at 0 ms to 8.3 ms.

The frame interval corresponding to 120 Hz is 8.3 ms, and therefore in S1001, the application thread draws and renders the first image frame at the frame interval of 8.3 ms.

Specifically, a timer may be set in the thread Vsync to wake up the thread Vsync at 0 ms. After being awoken, the thread Vsync transmits a Vsync message to the application thread, where the Vsync message carries a frame interval of 8.3 ms and a timestamp of 0 ms. After receiving the Vsync message from the thread Vsync, the application thread saves the timestamp in the message.

Assuming that a sliding speed when an image frame is normally displayed is 1 pixel/8.3 ms, a displacement of the first image frame may be calculated to be 8.3*1 pixel/8.3 ms=1 pixel. Then, a rendering thread is notified so that the rendering thread renders the first image frame at the displacement of 1 pixel. After rendering is completed, the rendering thread transmits the first image frame to a buffer thread for queuing for later compositing.

S1002. A system triggers a compositing thread to transmit, at 0 ms to 8.3 ms, a frame interval modification notification message to the thread Vsync.

In S1002, the application thread may initiate a frame rate switching request based on an application need. For example, when the electronic device is heavily loaded, a main application thread may initiate the frame rate switching request to request to switch a frame rate from 120 Hz to 90 Hz.

The frame interval modification notification message in S1002 is used for notifying the thread Vsync to modify a frame interval in a Vsync message after a next Vsync message to 11.1 ms.

As shown in FIG. 8, at 0 ms to 8.3 ms, a frame interval array stored in a buffer is [{1,8.3}]. Therefore, a VsyncID carried in the frame interval modification notification message generated by the compositing thread is 1. In the example of FIG. 8, the electronic device needs to switch from 120 Hz to 90 Hz, and therefore the frame interval modification notification message also carries information of target frame rate=90 Hz.

The frame interval modification notification message in S1002 is used for notifying the thread Vsync to modify, at a time corresponding to a VsyncID after a next VsyncID, namely, a VsyncID of 3, a frame interval to 11.1 ms. The Vsync message after a next Vsync message herein is the corresponding first Vsync message with a VsyncID of 3.

S1003. The thread Vsync transmits a first Vsync message to the application thread at 16.6 ms.

A frame interval carried in the first Vsync message is 11.1 ms.

Specifically, in FIG. 8, the thread Vsync transmits a Vsync message to the application thread at 0 ms, 8.3 ms, 16.6 ms, and the like. After the compositing thread notifies the thread Vsync to modify the frame interval to 11.1 ms, the thread Vsync transmits a Vsync message at 8.3 ms, and a frame interval in that Vsync message remains unchanged, still 8.3 ms. When the thread Vsync transmits another Vsync message at 16.6 ms, namely, the first Vsync message transmitted in S1003, the frame interval needs to be modified to 11.1 ms.

S1004. The application thread draws and renders a second image frame at a frame interval corresponding to 90 Hz.

In S1004, the application thread has received the first Vsync message carrying the modified frame interval, and therefore the application thread starts to draw and render the second image frame at the modified frame interval.

The frame interval corresponding to 90 Hz is 11.1 ms, and therefore in S1004, the application thread specifically draws and renders the second image frame at the frame interval of 11.1 ms.

Specifically, with reference to FIG. 8, a timer may be set in the thread Vsync to wake up the thread Vsync at 16.6 ms. After being awoken, the thread Vsync transmits the first Vsync message to the application thread, where the first Vsync message carries a frame interval of 11.1 ms and a timestamp of 16.6 ms. After receiving the first Vsync message from the thread Vsync, the application thread saves the timestamp in the message.

Assuming that a sliding speed when an image frame is normally displayed is 1 pixel/8.3 ms, a displacement of the second image frame may be calculated to be 11.1*1 pixel/8.3 ms=1.3 pixels. Then, a rendering thread is notified so that the rendering thread renders the second image frame at the displacement of 1.3 pixels. After rendering is completed, the rendering thread transmits the second image frame to a buffer thread for queuing for later compositing.

S1005. The system triggers the compositing thread to call a function performSetActiveMode to wake up a hardware composer thread to switch a frame rate from 120 Hz to 90 Hz.

In S1005, the system triggering the compositing thread to call the function performSetActiveMode can start or wake up the hardware composer, so that the hardware composer switches the frame rate from 120 Hz to 90 Hz.

As shown in FIG. 8, after being awoken, the hardware composer may control the hardware integration unit to switch a frame rate from 120 Hz to 90 Hz, and the hardware integration unit completes switching at 52.6 ms.

S1006. The system triggers the compositing thread to call a function setDuration to set a period parameter corresponding to 90 Hz for the thread Vsync, so that the thread Vsync transmits the Vsync message at 90 Hz.

In S1006, by calling the function setDuration, the compositing thread can set the period parameter corresponding to 90 Hz (which may be specifically the frame interval of 11.1 ms corresponding to 90 Hz) for the thread Vsync, so that the thread Vsync transmits the Vsync message at the frequency of 90 Hz.

Specifically, by calling the function setDuration, the compositing thread can notify the thread Vsync to switch a software period to 90 Hz during 33.2 ms to 52.6 ms to complete frequency switching. After frame rate switching is completed, a new timing time is set for a timer based on a timestamp of 41.5 ms and the new frame interval, so that the timer subsequently wakes up the thread Vsync based on the new timing time (a timing time that matches 90 Hz).

In S1005 and S1006, by calling two different functions, the compositing thread enables the hardware integration unit and the thread Vsync to simultaneously switch a frame rate from 120 Hz to 90 Hz at 52.6 ms.

For better understanding of the frame rate switching method in this embodiment of this application, the following details the frame rate switching method in the embodiments of this application from another perspective with reference to timing diagrams and interaction diagrams in FIG. 9 to FIG. 14.

Figure 9:
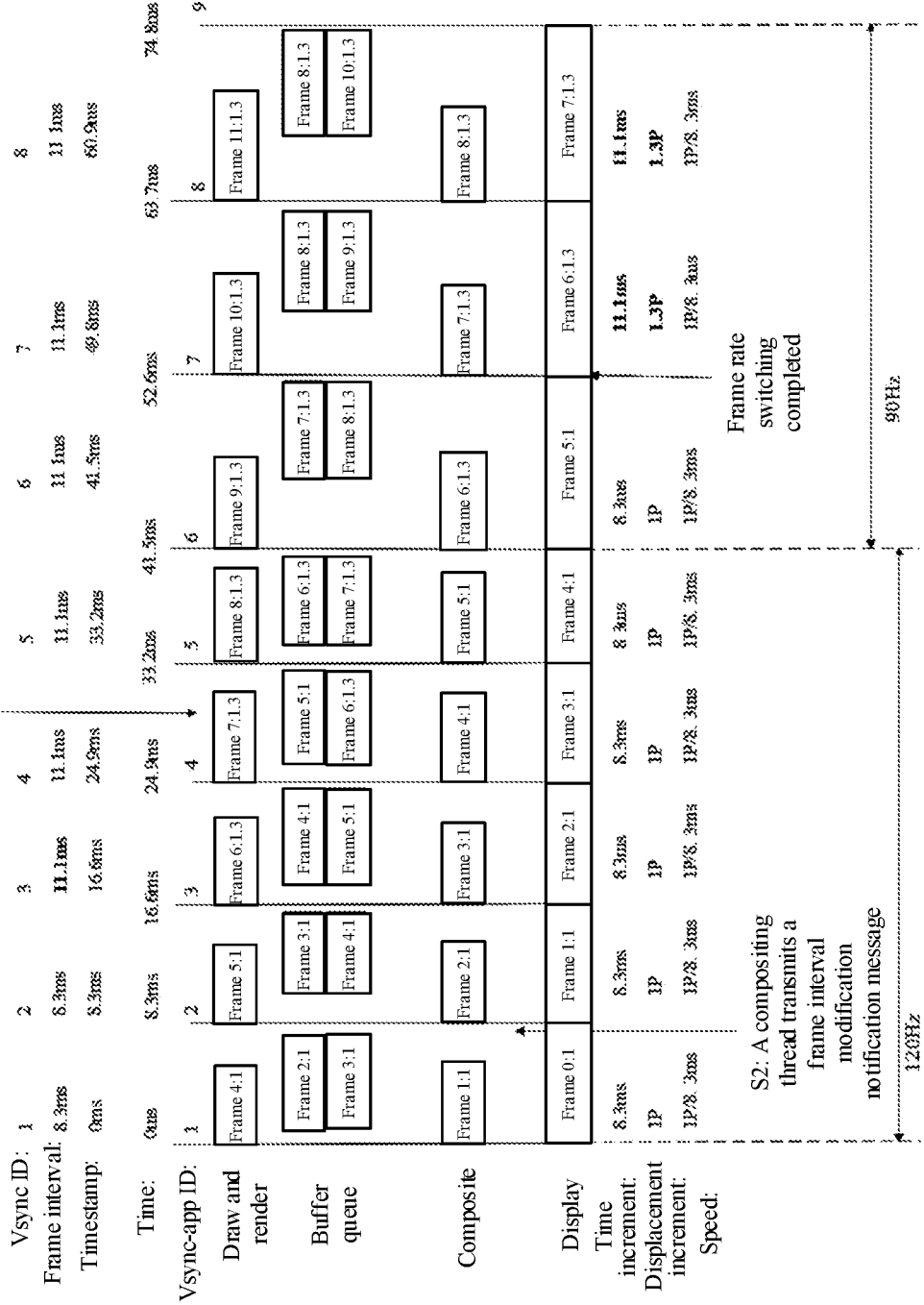
FIG. 9 is a schematic diagram of a frame rate switching process of a frame rate switching method according to an embodiment of this application.

FIG. 9 is a schematic diagram of a frame rate switching process of a frame rate switching method according to an embodiment of this application.

As shown in FIG. 9, Vsync timestamps, identifiers ID of Vsync-APPs, identifiers ID of Vsync-SF, and buffer information are marked in the upper part of the figure. Two frame buffers are present in a buffer queue, and a number after the colon in each frame represents a displacement of a current frame under rendering relative to a previous frame, measured in pixels.

As shown in FIG. 9, a frame rate of an electronic device needs to be switched from 120 Hz to 90 Hz. In this embodiment, a main application thread does not need to transmit a frame rate switching request message to a compositing thread any more. Instead, the compositing thread proactively determines to implement frame rate switching, and notifies a thread Vsync to modify, in advance, a frame interval used in drawing and rendering an image frame and display the image frame whose frame interval is adjusted in advance at a switched-to frame rate, so that a rendering speed of the image frame and a sliding speed of the image frame in display are consistent, thereby avoiding fluctuation of the sliding speed during image display.

The frame rate switching process in FIG. 9 mainly includes steps S2 and S3, and these steps are detailed below.

In the process shown in FIG. 9, the electronic device stores a frame interval array in a buffer, and the frame interval array may record a plurality of pieces of data, and each piece of data may include a VsyncID and a frame interval corresponding to the VsyncID.

For example, at 0 ms to 8.3 ms, a frame interval array stored in a buffer is [{1,8.3}]. The frame interval array means that when the VsyncID is 1, a corresponding frame interval is 8.3 ms. For another example, at 8.3 ms to 16.6 ms, a frame interval array stored in a buffer is [{1,8.3}, {2,8.3}]. The frame interval array means that when VsyncIDs are 1 and 2, corresponding frame intervals both are 8.3 ms.

Each time a new Vsync message arrives, data saved in the frame interval array herein is updated. For example, if the frame interval array saved in the buffer at 0 ms to 8.3 ms is [{1,8.3}], after receiving a new Vsync message at 8.3 ms, the main application thread updates the frame interval array to [{1,8.3}, {2,8.3}].

S2. The compositing thread transmits a frame interval modification notification message.

As shown in FIG. 9, the compositing thread transmits the frame interval modification notification message to a thread Vsync at 0 ms to 8.3 ms.

It should be understood that before S2, the compositing thread has determined to implement frame rate switching. For example, when a pop-up window or a user sliding operation is detected, the compositing thread directly determines to implement frame rate switching. Next, the compositing thread may generate the frame interval modification notification message based on information recorded in a currently latest frame interval array, and transmit the frame interval modification notification message to the thread Vsync. In the example shown in FIG. 9, the frame rate of the electronic device needs to be switched from 120 Hz to 90 Hz.

As shown in FIG. 9, at 0 ms to 8.3 ms, a frame interval array stored in a buffer is [{1,8.3}]. Therefore, a VsyncID carried in the frame interval modification notification message generated by the compositing thread is 1. In the example of FIG. 9, the electronic device needs to switch from 120 Hz to 90 Hz, and therefore the frame interval modification notification message also carries information of target frame rate=90 Hz.

The frame interval modification notification message in S2 is used for notifying the thread Vsync to modify, at a time corresponding to a VsyncID after a next VsyncID, namely, a VsyncID of 3, a frame interval to 11.1 ms.

Specifically, in the process shown in FIG. 9, a VsyncID carried in the frame interval modification notification message is 1. Therefore, the thread Vsync modifies a frame interval in a Vsync message with a VsyncID of 3 to 11.1 ms after receiving the frame interval modification notification message.

As shown in FIG. 9, the timer wakes up the thread Vsync at 16.6 ms, and the thread Vsync transmits a Vsync-app signal to the main application thread at 16.6 ms. The signal carries a Vsync identifier of 3 (VsyncID=3), a frame interval of 11.1 ms, and a timestamp of 16.6 ms (the Vsync-app signal is at the top in FIG. 9).

After receiving the Vsync-app signal from the thread Vsync, the main application thread saves the timestamp in the message, and obtains through calculation that a displacement of a frame 6 is 11.1 ms*1 pixel/8.3 ms=1.3 pixels. Then, a rendering thread is notified so that the rendering thread renders the frame 6 at the displacement of 1.3 pixels. After rendering is completed, the rendering thread transmits the frame 6 to a buffer thread for queuing for later compositing.

S3. The compositing thread transmits a frame rate switching notification message.

In step S3, the compositing thread determines to switch a frame rate from 120 Hz to 90 Hz, and transmits the frame rate switching notification message to a hardware composer and the thread Vsync, so as to implement frame rate switching.

A specific decision-making mechanism of the compositing thread is as follows:

After determining to implement frame rate switching, the compositing thread determines whether a VsyncID of a to-be-composited image frame is 1 during image frame compositing, and transmits the frame rate switching notification message to the hardware composer and the thread Vsync if determining that a VsyncID of a to-be-composited image frame is 1.

As shown in FIG. 9, the compositing thread needs to composite a frame 4 with a VsyncID of 1 at 24.9 ms to 33.2 ms. Therefore, the compositing thread transmits the frame rate switching notification message to the hardware composer and the thread Vsync at 24.9 ms to 33.2 ms.

Through the above process, the electronic device completes frame rate switching at 52.6 ms.

After the compositing thread transmits the frame rate switching notification message, it takes two periods for the frame rate switching to complete. Therefore, in FIG. 9, frame rate switching is completed at 52.6 ms. At this point, frequency of a hardware Vsync signal and a software Vsync signal has also been switched to 90 Hz.

As shown in FIG. 9, after deciding, at 24.9 ms to 33.2 ms, to implement frame rate switching, a frame rate control system notifies the hardware composer to control the hardware integration unit to switch a frame rate from 120 Hz to 90 Hz, and the hardware integration unit completes switching at 52.6 ms.

In addition, the compositing thread notifies the thread Vsync to switch a software period to a new period (the new period corresponds to the new frame rate) during 33.2 ms to 52.6 ms to complete frequency switching. After frame rate switching is completed, a new timing time is set for a timer based on a timestamp of 41.5 ms and the new frame interval, so that the timer subsequently wakes up the thread Vsync based on the new timing time.

The foregoing frame rate switching process of the frame rate switching method shown in FIG. 9 usually involves interaction between many modules. For ease of understanding, the following describes interaction processes between various modules in the frame rate switching process shown in FIG. 9 with reference to FIG. 10.

Figure 10:
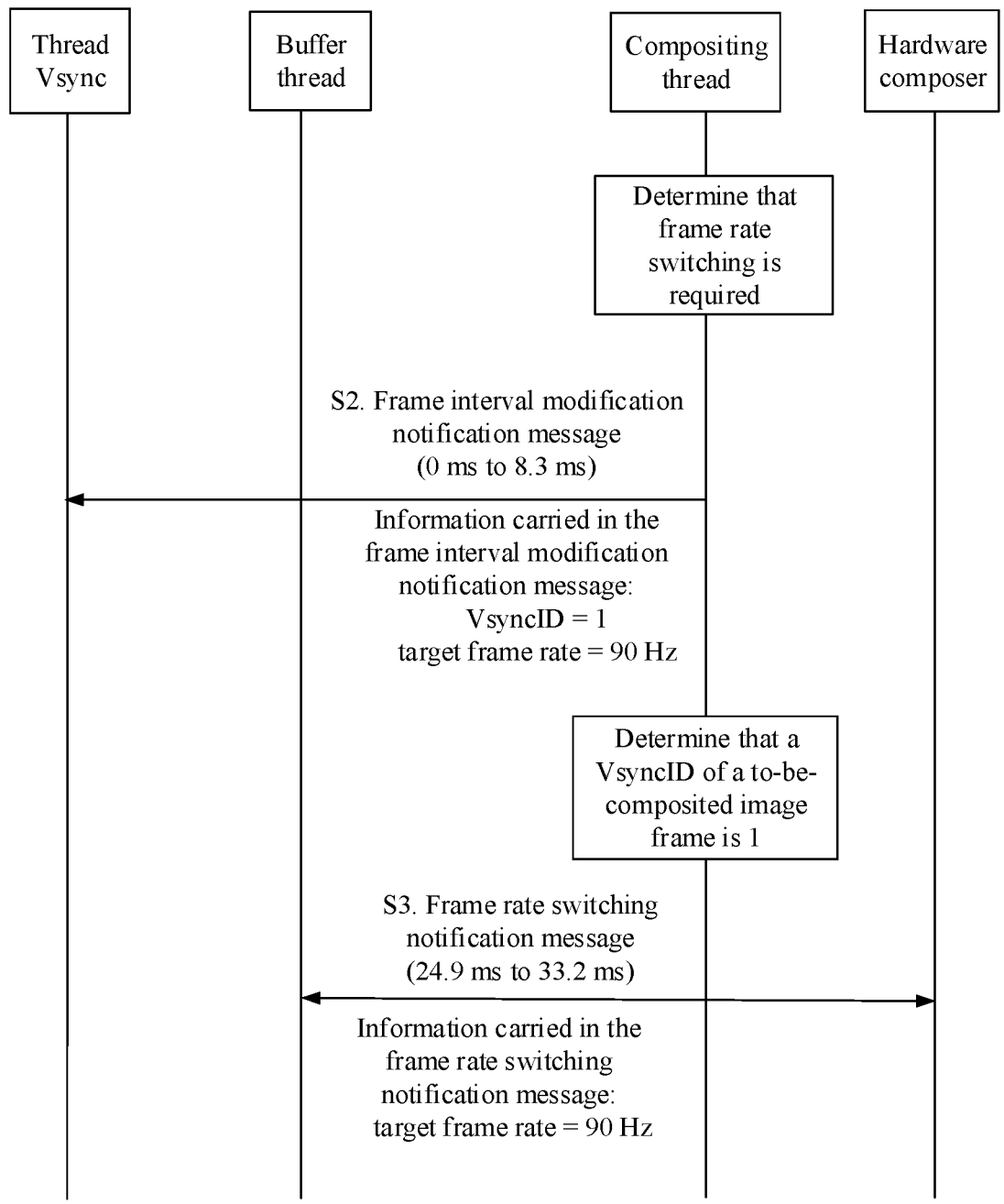
FIG. 10 is an interaction diagram of a frame rate switching process of a frame rate switching method according to an embodiment of this application.

For example, FIG. 10 is a schematic diagram of an interaction process between various modules in a frame rate switching process of a frame rate switching method according to an embodiment of this application.

FIG. 10 corresponds to the process shown in FIG. 9. FIG. 10 also includes S2 and S3, and S2 and S3 are detailed below.

S2. A compositing thread transmits a frame interval modification notification message to a thread Vsync at 0 ms to 8.3 ms.

The frame interval modification notification message carried a VsyncID of 1 and a target frame rate of 90 Hz.

S3. The compositing thread transmits a frame rate switching notification message to a hardware composer and the thread Vsync at 24.9 ms to 33.2 ms.

It can be understood that before S3, the compositing thread needs to determine when to transmit the frame rate switching notification message to the hardware composer and the thread Vsync. A latest VsyncID stored in a frame interval array is 1 when the compositing thread transmits the frame interval modification notification message. Therefore, the compositing thread determines whether a VsyncID of a to-be-composited image frame is 1 during image frame compositing, and transmits the frame rate switching notification message to the hardware composer and the thread Vsync if determining that a VsyncID of a to-be-composited image frame is 1, so that a hardware integration unit and the thread Vsync implement frame rate switching.

The frame rate switching process in a case that two buffers are accumulated in a buffer queue has been detailed above with reference to FIG. 9 and FIG. 10, and a frame rate switching process in a case that one buffer is accumulated in a buffer queue is described below with reference to FIG. 11.

Figure 11:
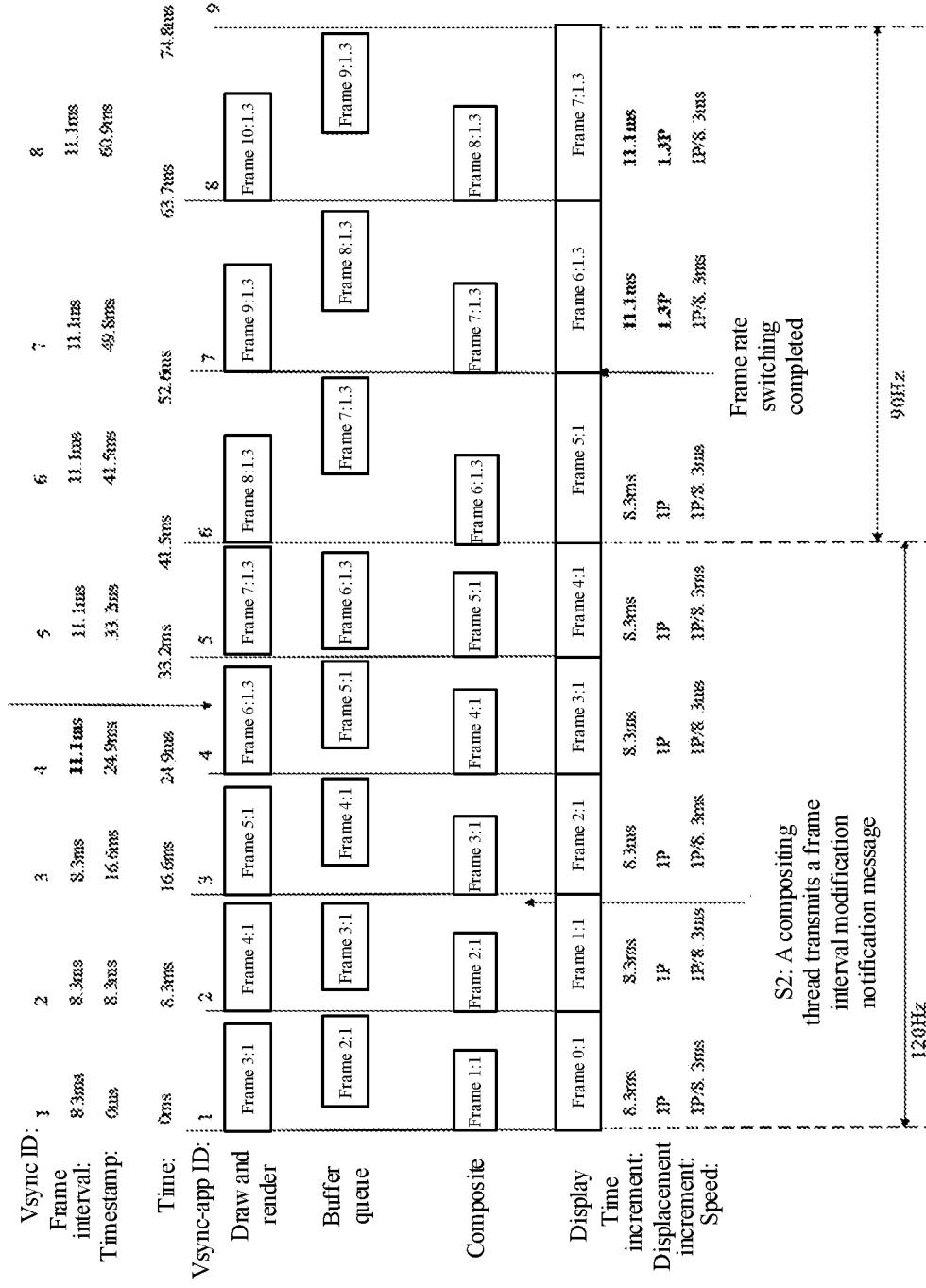
FIG. 11 is a schematic diagram of a frame rate switching process of a frame rate switching method according to an embodiment of this application.

FIG. 11 is a schematic diagram of a frame rate switching method according to an embodiment of this application.

As shown in FIG. 11, a frame rate of an electronic device is also to be switched from 120 Hz to 90 Hz. The frame rate switching process shown in FIG. 11 also includes steps S2 and S3. S2 and S3 are mainly detailed below.

In the process shown in FIG. 11, the electronic device also stores a frame interval array in a buffer, and the frame interval array may record a plurality of arrays, and each piece of data may include a VsyncID and a frame interval corresponding to the VsyncID.

For example, at 8.3 ms to 16.6 ms, a frame interval array stored in a buffer is [{1,8.3}, {2,8.3}]. The frame interval array means that when VsyncIDs are 1 and 2, corresponding frame intervals both are 8.3 ms. At 16.6 ms to 24.9 ms, a frame interval array stored in a buffer is [{1,8.3}, {2,8.3}, {3,8.3}]. The frame interval array means that when VsyncIDs are 1 to 3, corresponding frame intervals are all 8.3 ms.

S2. A compositing thread transmits a frame interval modification notification message.

As shown in FIG. 11, the compositing thread transmits the frame interval modification notification message to a thread Vsync at 8.3 ms to 16.6 ms.

It should be understood that before S2, the compositing thread has determined to implement frame rate switching. For example, when a pop-up window or a user sliding operation is detected, the compositing thread directly determines to implement frame rate switching. Next, the compositing thread may generate the frame interval modification notification message based on information recorded in a currently latest frame interval array, and transmit the frame interval modification notification message to the thread Vsync. In the example shown in FIG. 11, the frame rate of the electronic device needs to be switched from 120 Hz to 90 Hz.

As shown in FIG. 11, at 8.3 ms to 16.6 ms, a frame interval array stored in a buffer is [{1,8.3}, {2,8.3}]. Therefore, a VsyncID carried in the frame interval modification notification message generated by the compositing thread is 2. In the example of FIG. 11, the electronic device needs to switch from 120 Hz to 90 Hz, and therefore the frame interval modification notification message also carries information of target frame rate=90 Hz.

The frame interval modification notification message in S2 is used for notifying the thread Vsync to modify, at a time corresponding to a VsyncID after a next VsyncID, namely, a VsyncID of 4, a frame interval to 11.1 ms.

Specifically, in the process shown in FIG. 11, a VsyncID carried in the frame interval modification notification message is 3. Therefore, the thread Vsync modifies a frame interval in a Vsync message with a VsyncID of 5 to 11.1 ms after receiving the frame interval modification notification message.

As shown in FIG. 11, the timer wakes up the thread Vsync at 33.2 ms, and the thread Vsync transmits a Vsync-app signal to a main application thread at 33.2 ms. The signal carries a Vsync identifier of 5 (VsyncID=5), a frame interval of 11.1 ms, and a timestamp of 33.2 ms (the Vsync-app signal is at the top in FIG. 11).

After receiving the Vsync-app signal from the thread Vsync, the main application thread saves the timestamp in the message, and obtains through calculation that a displacement of a frame 6 is 11.1 ms*1 pixel/8.3 ms=1.3 pixels. Then, a rendering thread is notified so that the rendering thread renders the frame 6 at the displacement of 1.3 pixels. After rendering is completed, the rendering thread transmits the frame 6 to a buffer thread for queuing for later compositing.

S3. The compositing thread transmits a frame rate switching notification message.

In step S3, the compositing thread determines to switch a frame rate from 120 Hz to 90 Hz, and transmits the frame rate switching notification message to a hardware composer and the thread Vsync, so as to implement frame rate switching.

A specific decision-making mechanism of the compositing thread is as follows:

After determining to implement frame rate switching, the compositing thread determines whether a VsyncID of a to-be-composited image frame is 2 during image frame compositing, and transmits the frame rate switching notification message to the hardware composer and the thread Vsync if determining that a VsyncID of a to-be-composited image frame is 2.

As shown in FIG. 11, the compositing thread needs to composite a frame 4 with a VsyncID of 1 at 24.9 ms to 33.2 ms. Therefore, the compositing thread transmits the frame rate switching notification message to a hardware composer and the thread Vsync at 24.9 ms to 33.2 ms.

Through the above process, the electronic device completes frame rate switching at 52.6 ms.

After the compositing thread transmits the frame rate switching notification message, it takes two periods for the frame rate switching to complete. Therefore, in FIG. 9, frame rate switching is completed at 52.6 ms. At this point, frequency of a hardware Vsync signal and a software Vsync signal has also been switched to 90 Hz.

As shown in FIG. 11, after deciding, at 24.9 ms to 33.2 ms, to implement frame rate switching, a frame rate control system notifies the hardware composer to control the hardware integration unit to switch a frame rate from 120 Hz to 90 Hz, and the hardware integration unit completes switching at 52.6 ms.

In addition, the compositing thread notifies the thread Vsync to switch a software period to a new period (the new period corresponds to the new frame rate) during 33.2 ms to 52.6 ms to complete frequency switching. After frame rate switching is completed, a new timing time is set for a timer based on a timestamp of 41.5 ms and the new frame interval, so that the timer subsequently wakes up the thread Vsync based on the new timing time.

Cases in which one buffer and two buffers are accumulated in a buffer queue in a frame rate switching process both have been described above with reference to FIG. 9 to FIG. 11. In some cases, buffers may alternatively not be included in a buffer queue. In this case, an image frame does not need to be buffered but can be directly processed by a compositing layer.

Figure 12:
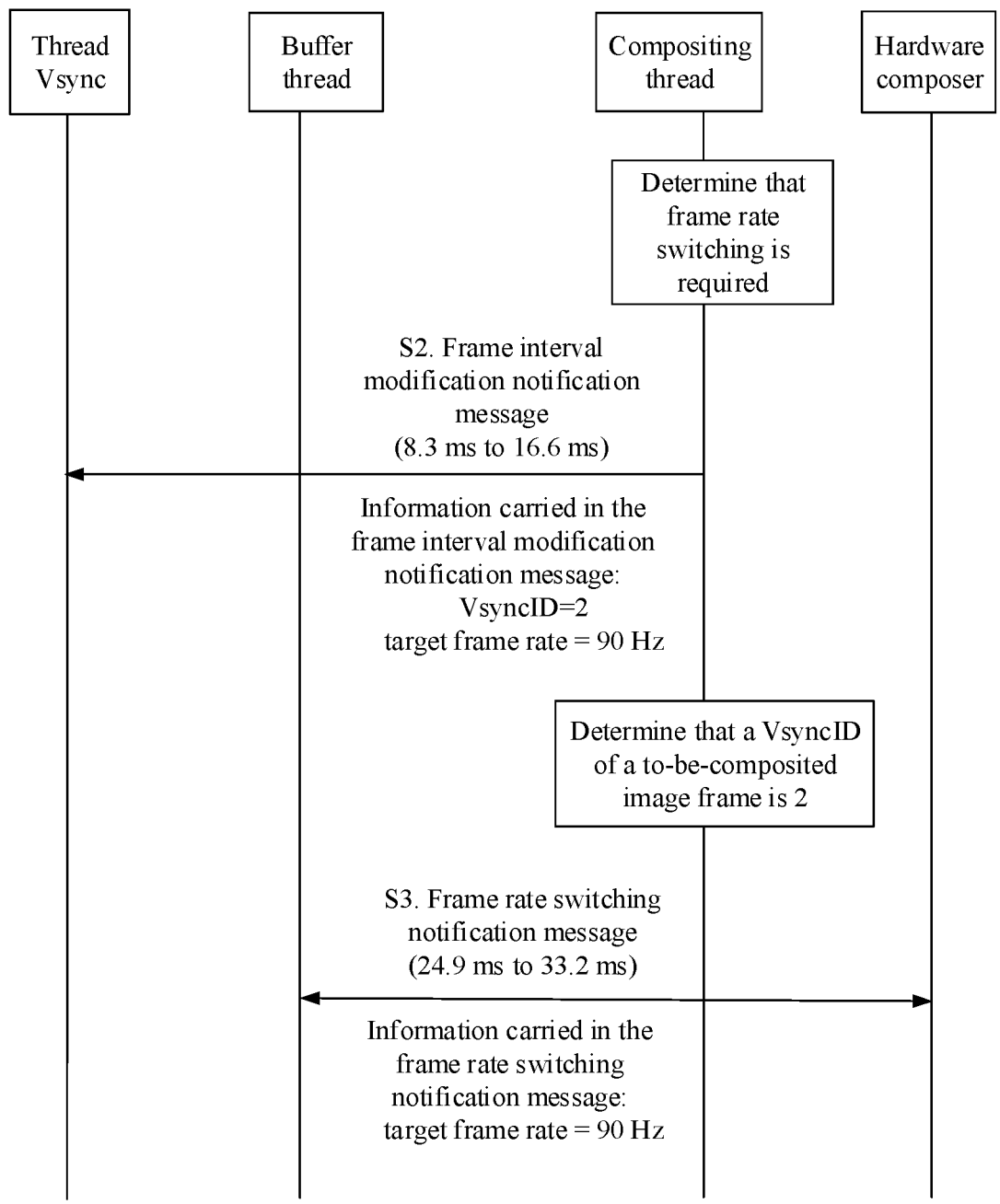
FIG. 12 is an interaction diagram of a frame rate switching process of a frame rate switching method according to an embodiment of this application.

FIG. 12 corresponds to the process shown in FIG. 11. FIG. 12 also includes S2 and S3, and S2 and S3 are detailed below.

S2. A compositing thread transmits a frame interval modification notification message to a thread Vsync at 8.3 ms to 16.6 ms.

The frame interval modification notification message carried a VsyncID of 2 and a target frame rate of 90 Hz.

S3. The compositing thread transmits a frame rate switching notification message to a hardware composer and the thread Vsync at 24.9 ms to 33.2 ms.

It can be understood that before S3, the compositing thread needs to determine when to transmit the frame rate switching notification message to the hardware composer and the thread Vsync. A latest VsyncID stored in a frame interval array is 2 when the compositing thread transmits the frame interval modification notification message. Therefore, the compositing thread determines whether a VsyncID of a to-be-composited image frame is 2 during image frame compositing, and transmits the frame rate switching notification message to the hardware composer and the thread Vsync if determining that a VsyncID of a to-be-composited image frame is 2, so that a hardware integration unit and the thread Vsync implement frame rate switching.

A case in which no buffers (0 buffers) are included in a buffer queue is described below with reference to FIG. 13.

Figure 13:
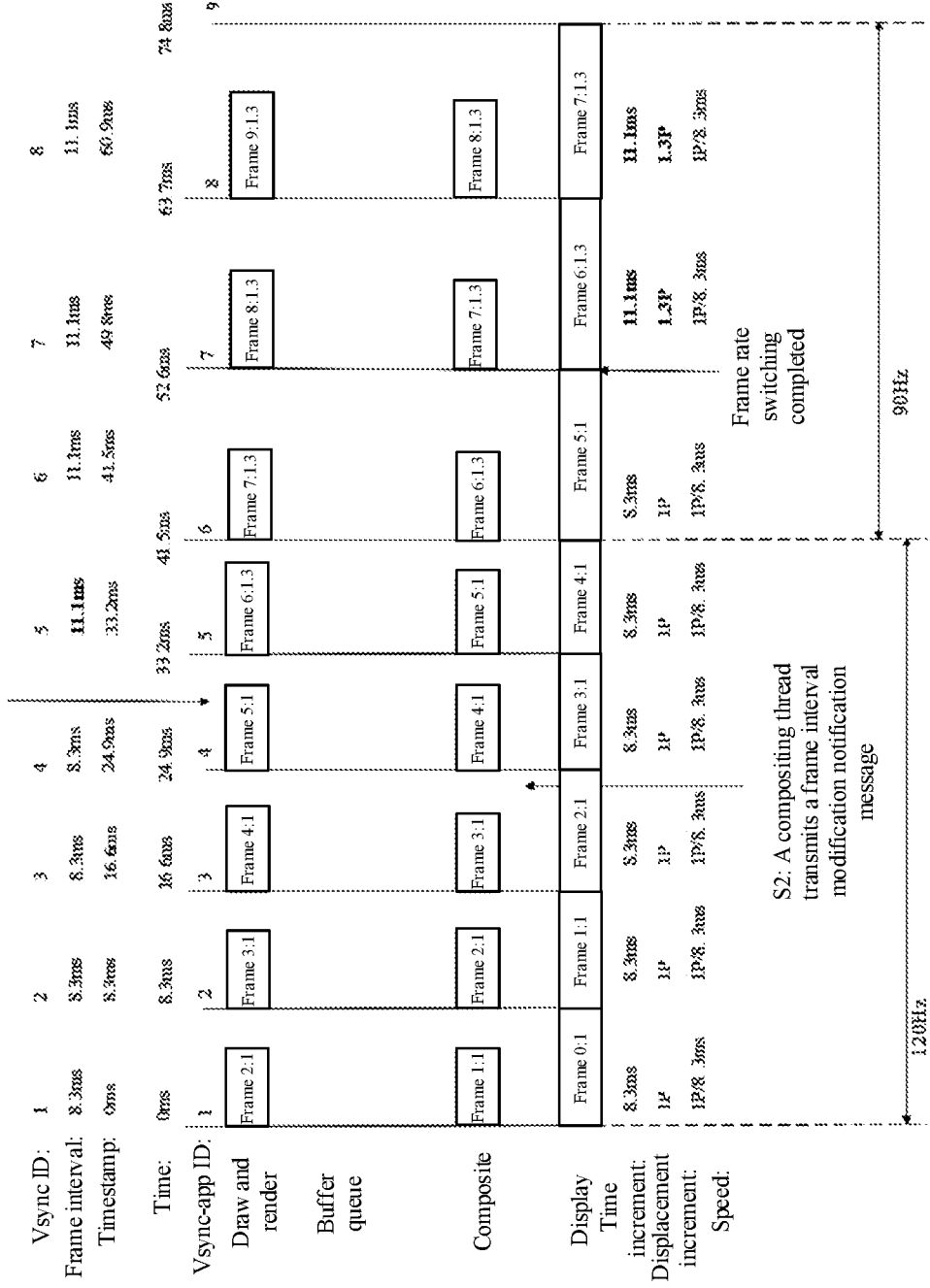
FIG. 13 is a schematic diagram of a frame rate switching process of a frame rate switching method according to an embodiment of this application.

FIG. 13 is a schematic diagram of a frame rate switching method according to an embodiment of this application.

As shown in FIG. 13, a frame rate of an electronic device is also to be switched from 120 Hz to 90 Hz. The frame rate switching process shown in FIG. 13 also includes steps S2 and S3. S2 and S3 are mainly detailed below.

In the process shown in FIG. 13, the electronic device also stores a frame interval array in a buffer, and the frame interval array may record a plurality of arrays, and each piece of data may include a VsyncID and a frame interval corresponding to the VsyncID.

For example, at 8.3 ms to 16.6 ms, a frame interval array stored in a buffer is [{1,8.3}, {2,8.3}]. The frame interval array means that when VsyncIDs are 1 and 2, corresponding frame intervals both are 8.3 ms. At 16.6 ms to 24.9 ms, a frame interval array stored in a buffer is [{1,8.3}, {2,8.3}, {3,8.3}]. The frame interval array means that when VsyncIDs are 1 to 3, corresponding frame intervals are all 8.3 ms.

S2. A compositing thread transmits a frame interval modification notification message.

As shown in FIG. 13, the compositing thread transmits the frame interval modification notification message to a thread Vsync at 16.6 ms to 24.9 ms.

It should be understood that before S2, the compositing thread has determined to implement frame rate switching. For example, when a pop-up window or a user sliding operation is detected, the compositing thread directly determines to implement frame rate switching. Next, the compositing thread may generate the frame interval modification notification message based on information recorded in a currently latest frame interval array, and transmit the frame interval modification notification message to the thread Vsync. In the example shown in FIG. 13, the frame rate of the electronic device needs to be switched from 120 Hz to 90 Hz.

As shown in FIG. 13, at 16.6 ms to 24.9 ms, a frame interval array stored in a buffer is [{1,8.3}, {2,8.3}, {3,8.3}]. Therefore, a VsyncID carried in the frame interval modification notification message generated by the compositing thread is 3. In the example of FIG. 13, the electronic device needs to switch from 120 Hz to 90 Hz, and therefore the frame interval modification notification message also carries information of target frame rate=90 Hz.

The frame interval modification notification message in S2 is used for notifying the thread Vsync to modify, at a time corresponding to a VsyncID after a next VsyncID, namely, a VsyncID of 5, a frame interval to 11.1 ms.

Specifically, in the process shown in FIG. 13, a VsyncID carried in the frame interval modification notification message is 3. Therefore, the thread Vsync modifies a frame interval in a Vsync message with a VsyncID of 5 to 11.1 ms after receiving the frame interval modification notification message.

As shown in FIG. 13, the timer wakes up the thread Vsync at 33.2 ms, and the thread Vsync transmits a Vsync-app signal to a main application thread at 33.2 ms. The signal carries a Vsync identifier of 5 (VsyncID=5), a frame interval of 11.1 ms, and a timestamp of 33.2 ms (the Vsync-app signal is at the top in FIG. 13).

After receiving the Vsync-app signal from the thread Vsync, the main application thread saves the timestamp in the message, and obtains through calculation that a displacement of a frame 6 is 11.1 ms*1 pixel/8.3 ms=1.3 pixels. Then, a rendering thread is notified so that the rendering thread renders the frame 6 at the displacement of 1.3 pixels. After rendering is completed, the rendering thread transmits the frame 6 to a buffer thread for queuing for later compositing.

S3. The compositing thread transmits a frame rate switching notification message.

In step S3, the compositing thread determines to switch a frame rate from 120 Hz to 90 Hz, and transmits the frame rate switching notification message to a hardware composer and the thread Vsync, so as to implement frame rate switching.

A specific decision-making mechanism of the compositing thread is as follows:

After determining to implement frame rate switching, the compositing thread determines whether a VsyncID of a to-be-composited image frame is 3 during image frame compositing, and transmits the frame rate switching notification message to the hardware composer and the thread Vsync if determining that a VsyncID of a to-be-composited image frame is 3.

As shown in FIG. 13, the compositing thread needs to composite a frame 4 with a VsyncID of 1 at 24.9 ms to 33.2 ms. Therefore, the compositing thread transmits the frame rate switching notification message to a hardware composer and the thread Vsync at 24.9 ms to 33.2 ms.

Through the above process, the electronic device completes frame rate switching at 52.6 ms.

After the compositing thread transmits the frame rate switching notification message, it takes two periods for the frame rate switching to complete. Therefore, in FIG. 13, frame rate switching is completed at 52.6 ms. At this point, frequency of a hardware Vsync signal and a software Vsync signal has also been switched to 90 Hz.

As shown in FIG. 13, after deciding, at 24.9 ms to 33.2 ms, to implement frame rate switching, a frame rate control system notifies the hardware composer to control the hardware integration unit to switch a frame rate from 120 Hz to 90 Hz, and the hardware integration unit completes switching at 52.6 ms.

In addition, the compositing thread notifies the thread Vsync to switch a software period to a new period (the new period corresponds to the new frame rate) during 33.2 ms to 52.6 ms to complete frequency switching. After frame rate switching is completed, a new timing time is set for a timer based on a timestamp of 41.5 ms and the new frame interval, so that the timer subsequently wakes up the thread Vsync based on the new timing time.

Figure 14:
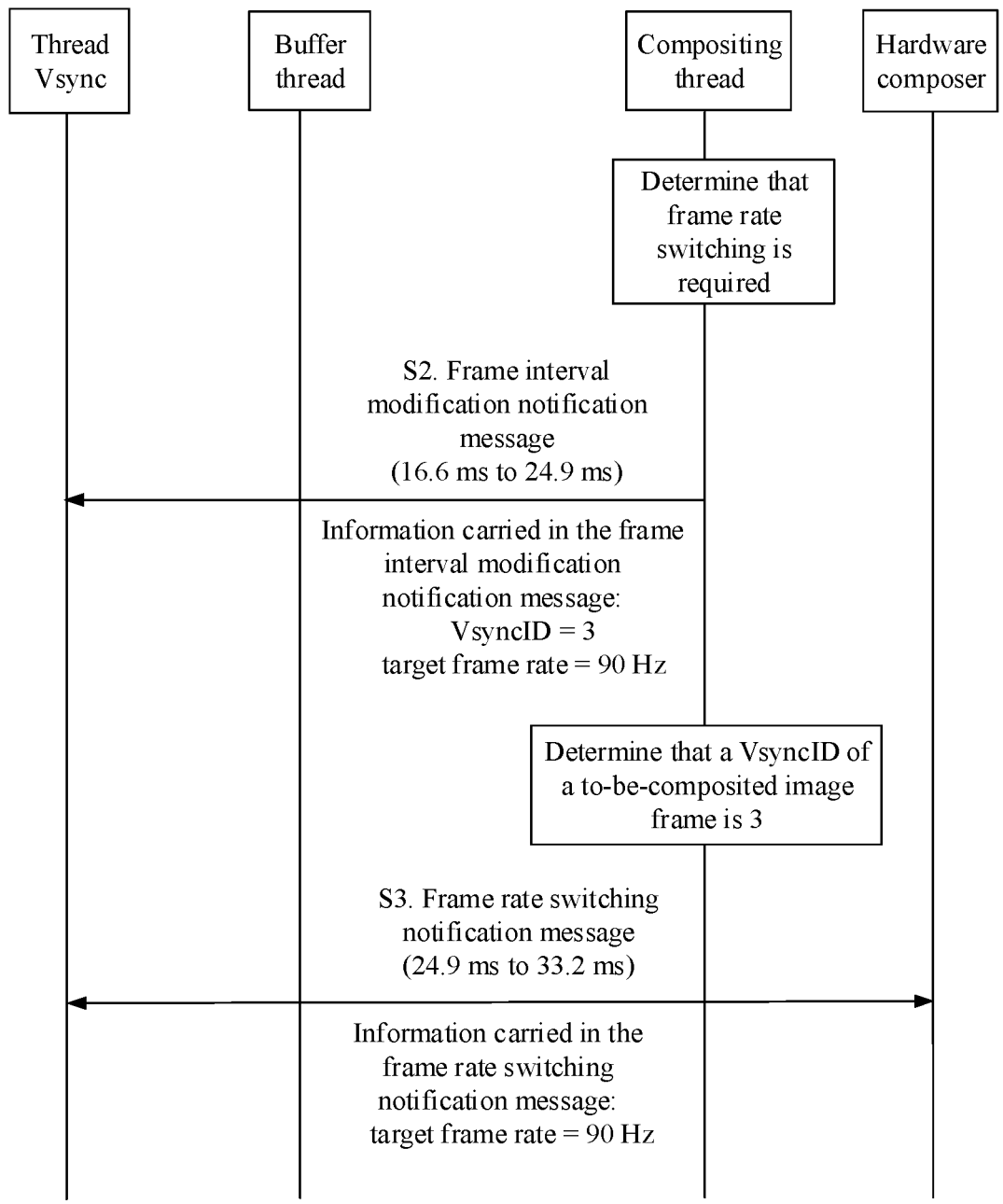
FIG. 14 is an interaction diagram of a frame rate switching process of a frame rate switching method according to an embodiment of this application.

FIG. 14 corresponds to the process shown in FIG. 13. FIG. 14 also includes S2 and S3, and S2 and S3 are detailed below.

S2. A compositing thread transmits a frame interval modification notification message to a thread Vsync at 16.6 ms to 24.9 ms.

The frame interval modification notification message carried a VsyncID of 3 and a target frame rate of 90 Hz.

S3. The compositing thread transmits a frame rate switching notification message to a hardware composer and the thread Vsync at 24.9 ms to 33.2 ms.

It can be understood that before S3, the compositing thread needs to determine when to transmit the frame rate switching notification message to the hardware composer and the thread Vsync. A latest VsyncID stored in a frame interval array is 3 when the compositing thread transmits the frame interval modification notification message. Therefore, the compositing thread determines whether a VsyncID of a to-be-composited image frame is 3 during image frame compositing, and transmits the frame rate switching notification message to the hardware composer and the thread Vsync if determining that a VsyncID of a to-be-composited image frame is 3, so that a hardware integration unit and the thread Vsync implement frame rate switching.

In a possible implementation, the computer-executable instructions in this embodiment of this application may also be referred to as application program code. This is not specifically limited in this embodiment of this application.

A data processing apparatus provided in an embodiment of this application is configured to implement the frame rate switching method in the foregoing embodiments, with similar implementation principles and technical effects. Details are not repeated herein again.

An embodiment of this application provides a terminal device. Refer to FIG. 1 for structure. A memory of the terminal device may be configured to store at least one program instruction, and a processor is configured to execute the at least one program instruction so as to implement the technical solution in the foregoing method embodiments. The implementation is similar to the foregoing method related embodiments in terms of implementation principles and technical effects. Details are not repeated herein again.

An embodiment of this application provides a chip. The chip includes a processor, and the processor is configured to call a computer program in a memory to implement the technical solution in the foregoing embodiments. The implementation is similar to the foregoing related embodiments in terms of implementation principles and technical effects. Details are not repeated herein again.

An embodiment of this application provides a computer program product. When the computer program product runs on an electronic device, the terminal device is enabled to perform the technical solution in the foregoing embodiments. The implementation is similar to the foregoing related embodiments in terms of implementation principles and technical effects. Details are not repeated herein again.

An embodiment of this application provides a computer-readable storage medium storing program instructions. When the program instructions are executed by a terminal device, the terminal device is enabled to perform the technical solution in the foregoing embodiments. The implementation is similar to the foregoing related embodiments in terms of implementation principles and technical effects. Details are not repeated herein again.

This embodiment of this application is described with reference to the flowcharts and/or block diagrams of the method, the device (system), and the computer program product according to the embodiments of this application. It should be understood that computer program instructions may be used to implement each process and/or each block in the flowcharts and/or the block diagrams and a combination of processes and/or blocks in the flowcharts and/or the block diagrams. These computer program instructions may be provided to a general-purpose computer, a special-purpose computer, an embedded processor, or a processing unit of another programmable data processing device to generate a machine, so that the instructions executed by the computer or the processing unit of the another programmable data processing device generate an apparatus for implementing a specific function in one or more processes in the flowcharts and/or in one or more blocks in the block diagrams.

The objectives, technical solutions, and beneficial effects of the present invention are further described in detail in the foregoing specific implementations. It should be understood that the foregoing descriptions are merely specific implementations of the present invention, but are not intended to limit the protection scope of the present invention. Any modification, equivalent replacement, or improvement made based on the technical solutions of the present invention shall fall within the protection scope of the present invention.

What is claimed is:

1. A frame rate switching method, comprising:
    drawing and rendering, by an application thread, a first image frame at a frame interval corresponding to a first frame rate in a first period;
    obtaining, by a compositing thread, a vertical synchronization identifier (VsyncID) of the first image frame from a frame interval array in the first period, wherein the VsyncID of the first image frame is a currently latest VsyncID stored in the frame interval array, and the frame interval array stores a plurality of VsyncIDs and frame intervals respectively corresponding to the plurality of VsyncIDs;

generating, by the compositing thread, a frame interval modification notification message based on the VsyncID of the first image frame;

transmitting, by the compositing thread, the frame interval modification notification message to a Vsync thread;

drawing and rendering, by the application thread, a second image frame at a frame interval corresponding to a second frame rate in a second period, wherein the second period is preceded by the first period, and the second frame rate is different from the first frame rate;

triggering, by a system, the compositing thread to transmit a first frame-rate-switching request to a hardware composer in a third period, wherein the third period is preceded by the second period, or the third period coincides with the second period; and switching, by the hardware composer, a frame rate from the first frame rate to the second frame rate in response to the first frame-rate-switching request so that the second image frame is displayed at the second frame rate.

2. The method according to claim 1, wherein the triggering, by the system, the compositing thread to transmit the first frame-rate-switching request to the hardware composer in the third period comprises:
calling, by the system, a setDesiredDisplayModeSpecs function of a composer process through inter-process communication so that the compositing thread transmits the first frame-rate-switching request to the hardware composer in the third period, wherein the compositing thread is a main thread of the composer process.

3. The method according to claim 1, wherein the triggering, by the system, the compositing thread to transmit the first frame-rate-switching request to the hardware composer in the third period comprises:
triggering, by the system in a case that a pop-up window is displayed on a display screen, the compositing thread to transmit the first frame-rate-switching request to the hardware composer in the third period.

4. The method according to claim 1, wherein the triggering, by the system, the compositing thread to transmit the first frame-rate-switching request to the hardware composer thread in the third period comprises:
triggering, by the system, the compositing thread to call a perform SetActiveMode function in the third period to wake up the hardware composer thread to switch a frame rate from the first frame rate to the second frame rate.

5. The method according to claim 1, wherein the method further comprises:
triggering, by the system, the compositing thread to transmit a second frame-rate-switching request to the Vsync thread in a fourth period, wherein the fourth period is preceded by the second period, or the fourth period coincides with the second period; and
transmitting, by the Vsync thread, a Vsync message at the second frame rate in response to the second frame-rate-switching request.

6. The method according to claim 5, wherein the triggering, by the system, the compositing thread to transmit the second frame-rate-switching request to the Vsync thread in the fourth period comprises:
calling, by the compositing thread, a setDuration function in the fourth period to set a period parameter corresponding to the second frame rate for the Vsync thread, so that the Vsync thread transmits the Vsync message at the second frame rate.

7. The method according to claim 1, wherein in a case that N buffers are accumulated in a buffer queue corresponding to the application thread, the third period is preceded by the second period, wherein N is an integer greater than or equal to 1.

8. The method according to claim 1, wherein in a case that 0 buffers are accumulated in a buffer queue corresponding to the application thread, the third period coincides with the second period.

9. The method according to claim 1, wherein before the drawing and rendering, by the application thread, the second image frame at the second frame rate in the second period, the method further comprises:
receiving, by the application thread, a first Vsync message from the Vsync thread, wherein the first Vsync message carries the frame interval corresponding to the second frame rate.

10. The method according to claim 9, wherein the receiving, by the application thread, the first Vsync message from the Vsync thread comprises:
receiving, by the application thread, the first Vsync message from the Vsync thread at a start moment of the second period.

11. The method according to claim 9, wherein the method is applied to an electronic device, and before the receiving, by the application thread, the first Vsync message from the Vsync thread, the method further comprises:
generating, by the Vsync thread, the first Vsync message in response to the frame interval modification notification message.

12. The method according to claim 1, wherein before the transmitting, by the compositing thread, the first frame-rate-switching request to the hardware composer in the third period, the method further comprises:
determining, by the compositing thread, a next period for compositing the first image frame as the third period.

13. An electronic device, wherein the electronic device comprises a processor, and the processor is configured to call a computer program in a memory to perform the method according to claim 1.

14. A non-transitory computer-readable storage medium, wherein the computer-readable storage medium stores computer instructions, and when the computer instructions are run on a terminal device, the terminal device is enabled to perform the method according to claim 1.

* * * * *